US007698096B2

(12) United States Patent
Ohta

(10) Patent No.: US 7,698,096 B2
(45) Date of Patent: Apr. 13, 2010

(54) INFORMATION PROCESSING APPARATUS, STORAGE MEDIUM, AND METHODOLOGY FOR CALCULATING AN OUTPUT VALUE BASED ON A TILT ANGLE OF AN INPUT DEVICE

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 139 days.

(21) Appl. No.: 12/078,111

(22) Filed: Mar. 27, 2008

(65) Prior Publication Data

US 2009/0187371 A1 Jul. 23, 2009

(30) Foreign Application Priority Data

Jan. 21, 2008 (JP) ............................. 2008-010842

(51) Int. Cl.
G01C 9/00 (2006.01)
G06F 19/00 (2006.01)

(52) U.S. Cl. ...................................... 702/151
(58) Field of Classification Search ................ 702/151, 702/94, 95, 141, 150, 152–154; 345/158, 345/162
See application file for complete search history.

(56) References Cited

U.S. PATENT DOCUMENTS

| 3,454,920 | A | 7/1969 | Mehr |
| 4,240,638 | A | 12/1980 | Morrison et al. |
| 4,739,128 | A | 4/1988 | Grisham |
| 4,816,810 | A | 3/1989 | Moore |
| 4,994,795 | A | 2/1991 | MacKenzie |
| 5,178,477 | A | 1/1993 | Gambaro |
| 5,296,871 | A | 3/1994 | Paley |
| 5,332,322 | A | 7/1994 | Gambaro |
| 5,506,605 | A | 4/1996 | Paley |

(Continued)

FOREIGN PATENT DOCUMENTS

EP 0 852 961 7/1998

(Continued)

OTHER PUBLICATIONS

ADXL330 Specification Sheet: Small, Low Power, 3-Axis ±3 g i MEMs® Accelerometer; Analog Devices, Inc., 2007.

(Continued)

*Primary Examiner*—Michael P. Nghiem
*Assistant Examiner*—Cindy H Khuu
(74) *Attorney, Agent, or Firm*—Nixon & Vanderhye P.C.

(57) ABSTRACT

A game apparatus stores, when an output value is equal to a boundary value of a predetermined range, boundary angle data representing a boundary angle corresponding to a tilt angle of an input device. The game apparatus obtains, from an input device, data including a value changed in accordance with a tilt angle of the input device so as to calculate the tilt angle of the input device. Thereafter, when a tilt angle calculated in a tilt calculation step is greater than the boundary angle represented by the boundary angle data, the boundary angle data is updated such that the tilt angle calculated in the tilt calculation step becomes a new boundary angle. The output value is calculated based on a ratio of the tilt angle calculated in the tilt calculation step to the boundary angle represented by the boundary angle data.

14 Claims, 17 Drawing Sheets

U.S. PATENT DOCUMENTS

| | | | |
|---|---|---|---|
| 5,512,892 | A | 4/1996 | Corballis et al. |
| 5,528,265 | A | 6/1996 | Harrison |
| 5,531,443 | A | 7/1996 | Cruz |
| 5,551,701 | A | 9/1996 | Bouton et al. |
| 5,563,628 | A | 10/1996 | Stroop |
| 5,574,479 | A | 11/1996 | Odell |
| 5,627,565 | A | 5/1997 | Morishita et al. |
| 5,667,220 | A | 9/1997 | Cheng |
| 5,670,988 | A | 9/1997 | Tickle |
| 5,702,305 | A | 12/1997 | Norman et al. |
| 5,724,106 | A | 3/1998 | Autry et al. |
| 5,734,807 | A | 3/1998 | Sumi |
| 5,875,257 | A | 2/1999 | Marrin et al. |
| 5,973,757 | A | 10/1999 | Aubuchon et al. |
| 5,982,356 | A | 11/1999 | Akiyama |
| 5,984,785 | A | 11/1999 | Takeda |
| 5,986,644 | A | 11/1999 | Herder et al. |
| 6,010,406 | A | 1/2000 | Kajikawa et al. |
| 6,184,862 | B1 | 2/2001 | Leiper |
| 6,280,327 | B1 | 8/2001 | Leifer et al. |
| 6,297,751 | B1 | 10/2001 | Fadavi-Ardekani |
| 6,325,718 | B1 | 12/2001 | Nishiumi et al. |
| 6,394,904 | B1 | 5/2002 | Stalker |
| 6,518,952 | B1 | 2/2003 | Leiper |
| 6,545,661 | B1 | 4/2003 | Goschy et al. |
| 6,816,151 | B2 | 11/2004 | Dellinger |
| 6,821,206 | B1 | 11/2004 | Ishida |
| 6,906,700 | B1 | 6/2005 | Armstrong |
| 6,982,697 | B2 | 1/2006 | Wilson et al. |
| 7,102,616 | B1 * | 9/2006 | Sleator ............ 345/158 |
| 7,139,983 | B2 | 11/2006 | Kelts |
| 7,158,118 | B2 | 1/2007 | Liberty |
| 7,262,760 | B2 | 8/2007 | Liberty |
| 7,292,151 | B2 | 11/2007 | Ferguson et al. |
| RE40,324 | E | 5/2008 | Crawford |
| 7,414,611 | B2 | 8/2008 | Liberty |
| 2001/0010514 | A1 | 8/2001 | Ishino |
| 2002/0098887 | A1 | 7/2002 | Himoto et al. |
| 2003/0052860 | A1 | 3/2003 | Park et al. |
| 2003/0144056 | A1 | 7/2003 | Leifer et al. |
| 2004/0152515 | A1 | 8/2004 | Wegmuller et al. |
| 2005/0096136 | A1 | 5/2005 | Ohta |
| 2005/0143173 | A1 | 6/2005 | Barney et al. |
| 2005/0150122 | A1 * | 7/2005 | Cho et al. ............ 33/356 |
| 2006/0052165 | A1 | 3/2006 | Ohta |
| 2006/0152488 | A1 | 7/2006 | Salsman et al. |
| 2007/0049374 | A1 | 3/2007 | Ikeda et al. |
| 2007/0050597 | A1 | 3/2007 | Ikeda |
| 2007/0052177 | A1 | 3/2007 | Ikeda et al. |
| 2007/0060391 | A1 | 3/2007 | Ikeda et al. |
| 2007/0066394 | A1 | 3/2007 | Ikeda et al. |
| 2007/0072674 | A1 | 3/2007 | Ohta |
| 2007/0072680 | A1 | 3/2007 | Ikeda |
| 2007/0191112 | A1 | 8/2007 | Ohta |
| 2007/0211026 | A1 | 9/2007 | Ohta |
| 2007/0211027 | A1 | 9/2007 | Ohta |
| 2007/0211050 | A1 | 9/2007 | Ohta |
| 2007/0213109 | A1 | 9/2007 | Sato et al. |
| 2007/0213128 | A1 | 9/2007 | Ohta |
| 2007/0222750 | A1 | 9/2007 | Ohta |
| 2007/0225938 | A1 * | 9/2007 | Ohta ............ 702/152 |
| 2007/0233424 | A1 | 10/2007 | Ohta |
| 2007/0243931 | A1 | 10/2007 | Ohta et al. |
| 2008/0015017 | A1 | 1/2008 | Ashida et al. |
| 2008/0039202 | A1 | 2/2008 | Sawano et al. |
| 2008/0125223 | A1 * | 5/2008 | Ohta ............ 463/36 |
| 2008/0174550 | A1 | 7/2008 | Laurila |
| 2008/0177497 | A1 | 7/2008 | Ohta |
| 2008/0207321 | A1 | 8/2008 | Ohta |
| 2008/0215288 | A1 | 9/2008 | Ohta |
| 2008/0275667 | A1 | 11/2008 | Ohta |
| 2008/0318677 | A1 | 12/2008 | Ohta |
| 2009/0093304 | A1 | 4/2009 | Ohta |
| 2009/0203445 | A1 | 8/2009 | Dohta |

FOREIGN PATENT DOCUMENTS

| | | |
|---|---|---|
| EP | 1 062 994 | 12/2000 |
| EP | 1 279 425 | 1/2003 |
| EP | 1 293 237 | 3/2003 |
| GB | 1 524 334 | 3/1977 |
| GB | 2 244 546 A | 5/1990 |
| JP | 60-077231 | 5/1985 |
| JP | 3-74434 | 7/1991 |
| JP | 05-56191 | 7/1993 |
| JP | 06-050758 | 2/1994 |
| JP | 06-154422 | 3/1994 |
| JP | 6-190144 | 7/1994 |
| JP | 06-198075 | 7/1994 |
| JP | 7-22312 | 4/1995 |
| JP | 10-33831 | 2/1998 |
| JP | 10-099542 | 4/1998 |
| JP | 2005-040493 | 2/2005 |
| JP | 2005-063230 | 10/2005 |
| JP | 2006-239945 | 9/2006 |
| JP | 2007-203785 | 8/2007 |
| JP | 2008-192192 | 8/2008 |
| WO | 94/02931 | 2/1994 |
| WO | WO 00/63874 | 10/2000 |
| WO | WO 02/17054 | 2/2002 |
| WO | 2004-051391 | 6/2004 |

OTHER PUBLICATIONS

U.S. Appl. No. 11/745,842, filed May 2007, Ashida et al.

Office Action (Non-Final) issued in U.S. Appl. No. 11/446,188 (Apr. 30, 2008).

Office Action (Non-Final) issued in U.S. Appl. No. 11/532,328 (Nov. 25, 2008).

Office Action (Final) issued in U.S. Appl. No. 11/446,188 (Feb. 27, 2009).

Office Action (Non-Final) issued in U.S. Appl. No. 11/446,188 (Oct. 21, 2009).

Office Action (Final) issued in U.S. Appl. No. 11/532,328 (Oct. 6, 2009).

Office Action (Examiner-Initiated Interview Summary) issued in U.S. Appl. No. 11/446,187 (Oct. 26, 2009).

Office Action (Non-Final) issued in U.S. Appl. No. 11/404,871 (Sep. 30, 2009).

Office Action (Final) issued in U.S. Appl. No. 11/404,871 (Mar. 18, 2009).

Office Action (Non-Final) issued in U.S. Appl. No. 11/404,871 (Sep. 4, 2008).

"ASCII Grip One Handed Controller," One Switch-ASCII Grip One Handed Playstation Controller, http://www.oneswitch.org.uk/1/ascii/grip.htm , Jul. 11, 2008, pp. 1-2. .

"Superfamicom Grip controller by ASCII," http://superfami.com/sfc_grip.html, Jul. 10, 2008, pp. 1-2.

Electro-Plankton Weblog, http://www.tranism.com/weblog/2005/09/, "This is the Revolution, Nintendo Style," Sep. 15, 2005, 2 pgs.

Kennedy, P.J., "Hand-Held Data Input Device," IBM Technical Disclosure Bulletin, vol. 26, No. 11, Apr. 1984, pp. 5826-5827.

"Ascii GRIP" One-Handed Controller The Ultimate One-Handed Controller Designed for the Playstation Game Console (ASCII Entertainment 1997).

"Game Controller" Wikipedia, Aug. 19, 2005, 7 pages, http://en.wikipedia.org/w/index.php?title=Game_controller&oldid=21390758.

Dichtburn, "Camera in Direct3D" Toymaker, Mar. 5, 2005, 5 pages, http://web.archive.org/web/20050206032104/http://toymaker.info/games/html/camera.html.

Marrin, "Possibilities for the Digital Baton as a General-Purpose Gestural Interface", Late-Breaking/Short Talks, CHI 97, Mar. 22-27, 1997 (pp. 311-312).

ADXL202 Specification Sheet: Low Cost ±2 g Dual Axis i MEMs® Accelerometer with Digital Output; Analog Devices, Inc., 1998.

Pictures of Microsoft Xwand retrieved on May 13, 2009 from http://www.kfl2.com/blogs/uploads/xwand.jpg and http://www.cs.cmu.edu/%7Edwilson/images/xwand.jpg.

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr., 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dll?ViewItem&item=350096666675&indexURL.

"Controllers-Atari Space Age Joystick," AtariAqe: Have You Played Atari Today? www.atariage.com/controller_page.html?SystemID=2600&ControllerID=12, 1980s.

"Controllers-Booster Grip," AtariAge: Have You Played Atari Today? www.atariage.com/controller_page.html?SystemID=2600&ControllerID=18, 1980s.

"Coleco Vision: Super Auction ™ Controller Set," www.vintagecomputing.com/wp-content/image/retroscan/coleco_sac_1_large.jpg, 1983.

Japanese Office Action from JP 2006-216569, which corresponds to U.S. Appl. No. 11/446,187, Oct. 20, 2009.

* cited by examiner

F I G. 3
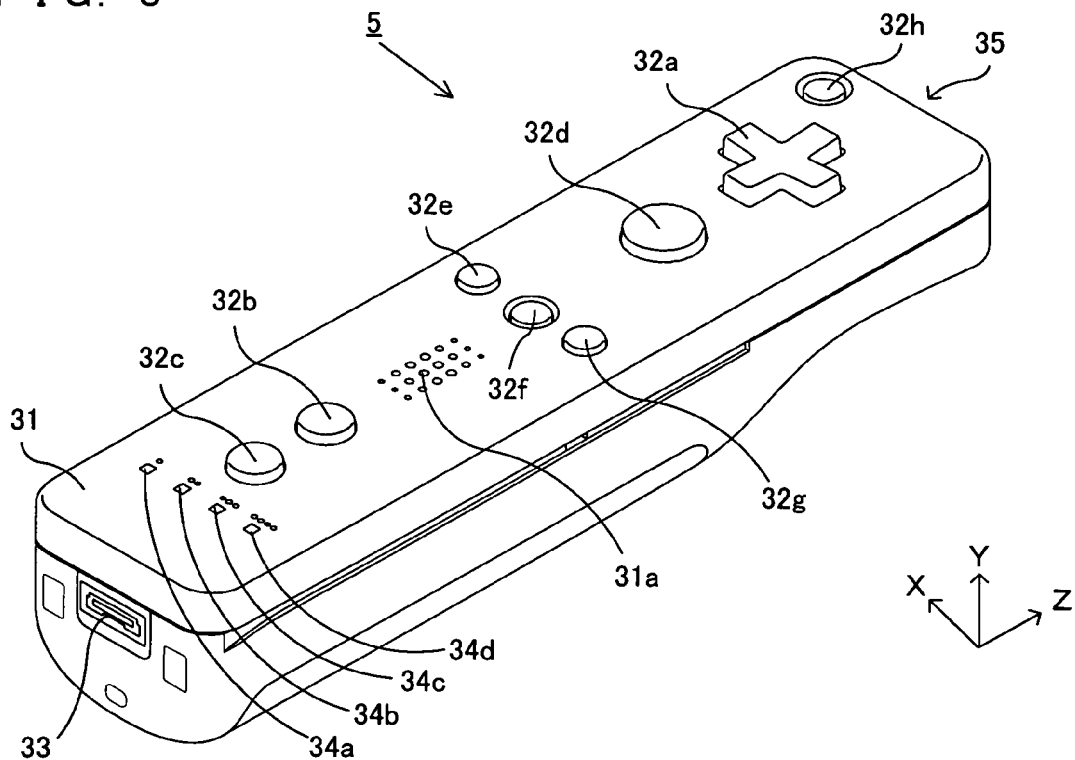
F I G. 4
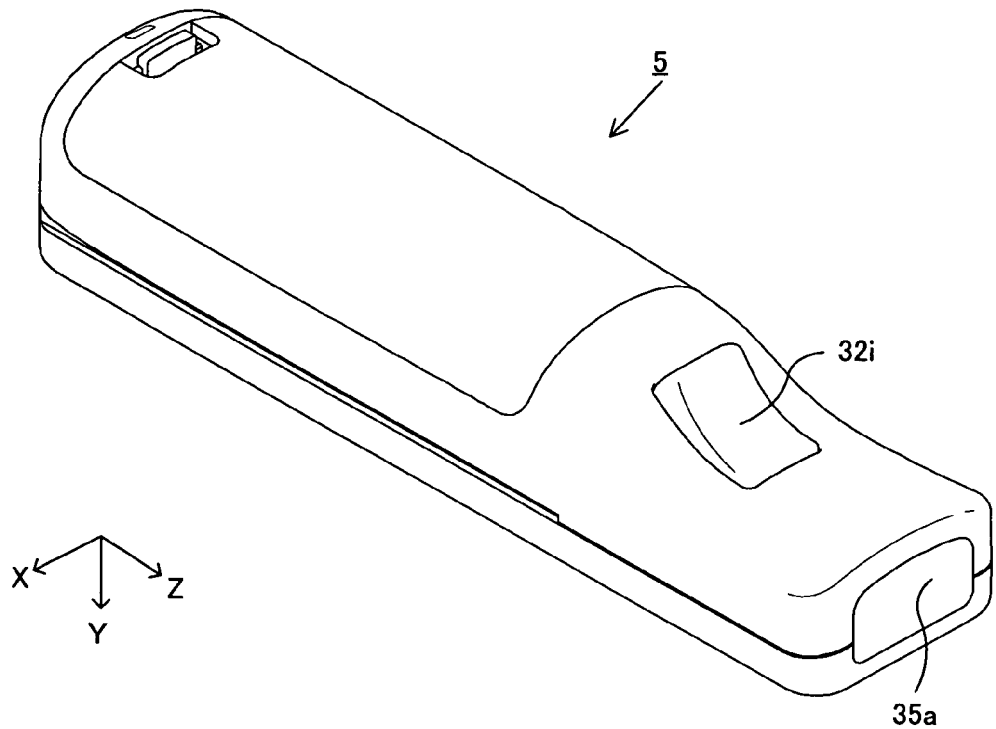

F I G. 7
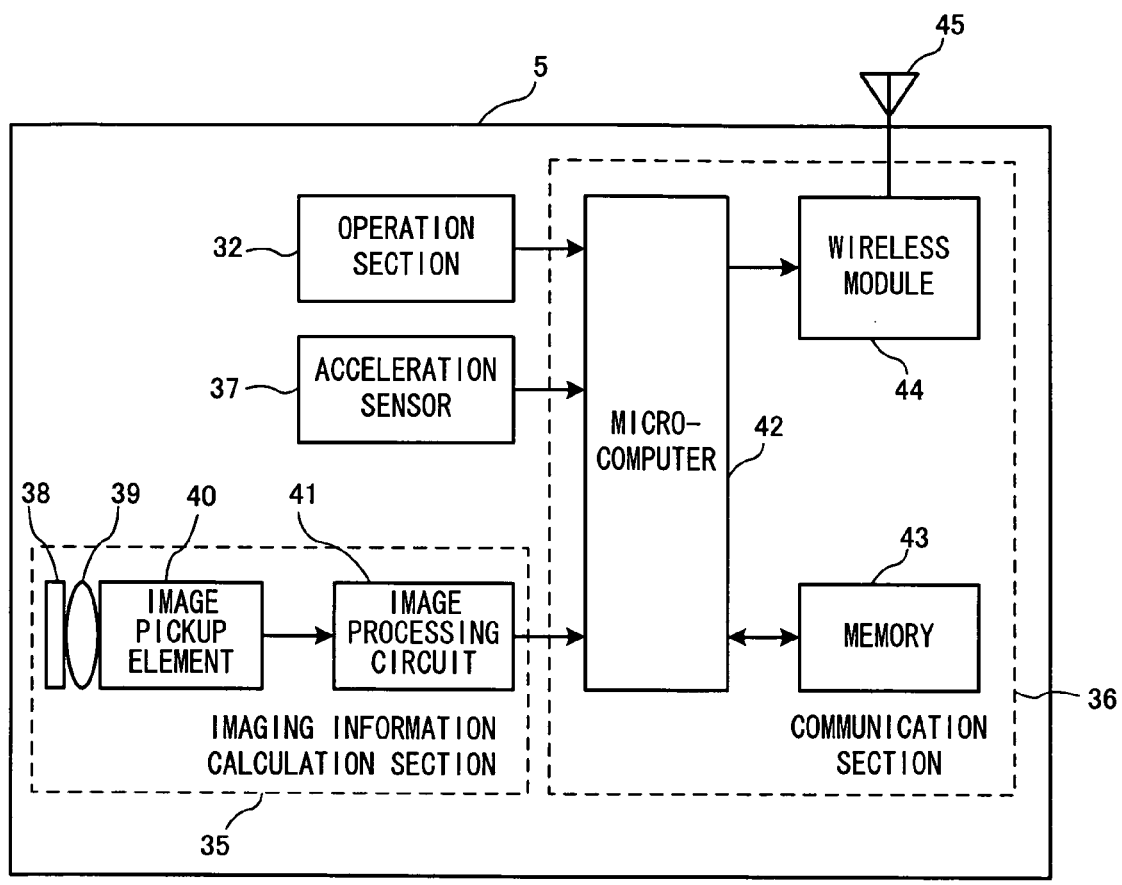

Z-AXIS
DIRECTION

GRAVITY
DIRECTION

INFORMATION PROCESSING APPARATUS, STORAGE MEDIUM, AND METHODOLOGY FOR CALCULATING AN OUTPUT VALUE BASED ON A TILT ANGLE OF AN INPUT DEVICE

CROSS REFERENCE TO RELATED APPLICATION

The disclosure of Japanese Patent Application No. 2008-010842, filed Jan. 21, 2008, is incorporated herein by reference.

BACKGROUND AND SUMMARY

1. Field of the Invention

The present invention relates to an information processing program and an information processing apparatus, and more particularly to an information processing program and an information processing apparatus both for calculating an output value based on a tilt of an input device capable of being tilted at any tilt angle.

2. Description of the Background Art

Patent document 1 (Japanese Laid-Open Patent Publication No. 6-190144) discloses a game apparatus capable of performing a game operation by tilting a controller. The controller (control key device) disclosed in patent document 1, having a triaxial acceleration sensor embedded therein, calculates a tilt angle of the controller by using the acceleration sensor. Furthermore, patent document 1 discloses that in a driving game played using the controller, the tilt angle of the controller is applied to a turning angle of a steering wheel of a vehicle appearing in the game.

In the above-described game apparatus capable of performing a game operation by tilting the controller, a player can tilt the controller at any tilt angle. On the other hand, an allowable range may be determined for an output value changed in accordance with the tilt angle of the controller. For example, in the case where an output value is applied to the turning angle of the steering wheel, an allowable range of the turning angle of the steering wheel may be determined. As such, while no limit is provided for a value of a tilt angle of the controller (i.e., an input value), a limit may be provided for an output value.

When a limit is set for an allowable range of an output value, it is considered to fixedly set a tilt angle, of the controller, obtained when an output value is equal to a boundary value of the range (e.g., an upper value and a lower value of the allowable range of the output value). That is, the output value is calculated so as to remain unchanged even if the controller is tilted at an angle greater than the boundary angle. However, in the case where the tilt angle is fixedly set, when the player tilts the controller within a range in which an output value remains unchanged even if the controller is tilted at an angle greater than the boundary angle, the output value never changes even though the controller is being moved. In this case, the player may feel that an operation applied to the controller does not reflect an output. Therefore, he or she may feel that an operation is not easy to perform.

Therefore, an object of an illustrative implementation is to provide a storage medium storing an information processing program and an information processing apparatus both of which are capable of improving the ease of operation using an input device capable of being tilted at any angle.

An illustrative implementation has the following features to attain the object mentioned above. The reference numerals, supplemental remarks and the like in the parentheses indicate the correspondence with the embodiment described below in order to aid in understanding the present invention and are not intended to limit, in any way, the scope of the present invention.

A first aspect is a computer-readable storage medium (optical disc 4) storing an information processing program (game program 60) to be executed by a computer (CPU 10) of an information processing apparatus (game apparatus 3) which calculates an output value within a predetermined range in accordance with a tilt angle of an input device (controller 5) capable of being tilted at any angle. Storage means (main memory) of the information processing apparatus stores boundary angle data (66, 67) representing a boundary angle corresponding to the tilt angle, of the input device, obtained when the output value is equal to a value of a boundary of the predetermined range. The information processing program causes the computer to execute a tilt calculation step (S2, S4), a first update step (S5) and an output calculation step (S6). In the tilt calculation step, the computer calculates the tilt angle of the input device by obtaining, from the input device, input data (acceleration data 62) including a value changed in accordance with the tilt angle of the input device. In the first update step, the computer updates, when the tilt angle calculated in the tilt calculation step is greater than the boundary angle represented by the boundary angle data, the boundary angle data such that the tilt angle calculated in the tilt calculation step becomes a new boundary angle. In the output calculation step, the computer calculates the output value based on a ratio of the tilt angle calculated in the tilt calculation step to the boundary angle represented by the boundary angle data.

In a second aspect, the storage means may further store a reference angle of the boundary angle. In this case, the information processing program causes the computer to further execute a second update step (S6) of updating, when the tilt angle calculated in the tilt calculation step is less than the boundary angle represented by the boundary angle data, the boundary angle data such that the boundary angle becomes the reference angle.

In a third aspect, the tilt calculation step may be repeatedly executed. In this case, the second update step includes a reduction step (S43 to S47) of repeatedly executing, each time the tilt calculation step calculates the tilt angle, a reduction process of decreasing the boundary angle within a range in which the boundary angle represented by the boundary angle data does not become less than the reference angle, until the boundary angle becomes equal to the reference angle.

In a fourth aspect, in the reduction step, the reduction process may be executed so as to decrease the boundary angle within a range in which the boundary angle represented by the boundary angle data does not become less than the tilt angle calculated in the tilt calculation step.

In a fifth aspect, the input device may include an acceleration sensor (37) for detecting an acceleration generated in the input device. In this case, the tilt calculation step includes an obtainment step (S2) and a calculation execution step (S4). In the obtainment step, the computer obtains the acceleration detected by the acceleration sensor. In the calculation execution step, the computer calculates the tilt angle of the input device by using the acceleration having been obtained.

In a sixth aspect, the tilt calculation step may further include a correction step (S3) for correcting the acceleration having been obtained. In this case, the obtainment step, the correction step and the calculation execution step are repeatedly executed. In the correction step, the computer corrects the acceleration which is currently obtained in the obtainment step so as to be close to a most recently corrected acceleration.

In the calculation execution step, the computer calculates the tilt angle of the input device by using the acceleration corrected in the correction step.

In a seventh aspect, in the correction step, the computer corrects the currently obtained acceleration such that the closer a magnitude of the currently obtained acceleration is to a magnitude of a gravitational acceleration, the closer the corrected currently obtained acceleration becomes to the currently obtained acceleration before being corrected.

In an eighth aspect, the acceleration sensor may detect the acceleration along respective axes of a predetermined three-dimensional coordinate system (XYZ coordinate system) set with respect to the input device. In this case, in the obtainment step, the computer obtains the acceleration represented by a three-dimensional vector in the three-dimensional coordinate system from the acceleration sensor. In the calculation execution step, the computer converts the three-dimensional vector into a two-dimensional vector on a plane (plane P) passing through an origin of the three-dimensional coordinate system, and represents the tilt angle of the input device by the two-dimensional vector having been converted.

In a ninth aspect, in the calculation execution step, the computer may convert the three-dimensional vector into a two-dimensional vector on a plane containing one axis of the three-dimensional coordinate system.

The present invention may be provided with an information processing device having a function equivalent to that of the information processing device executing the aforementioned steps from the first to ninth aspects. Furthermore, the present invention may be provided as an output value calculation method in which the aforementioned steps from the first to ninth aspects are executed.

According to the first aspect, when the tilt angle of the input device is greater than the boundary angle, the boundary angle data is updated such that the tilt angle becomes the new boundary angle. Then, the output value is calculated based on a ratio of the tilt angle to the boundary angle represented by the boundary angle data having been updated. Therefore, an operation applied to the input device always reflects an output value, thereby avoiding a problem that the output value remains unchanged even if the tilt angle of the input device changes. That is, it becomes possible to avoid the problem that the output value remains unchanged even if the operation is applied to the input device, whereby an ease of operation using the input device can be improved.

According to the second aspect, even when a boundary angle is changed in the first update step, the boundary angle returns to the reference angle if the tilt angle decreases thereafter. Therefore, even when a user tilts the input device at an angle steeper than necessary (i.e., at an angle greater than the reference angle) for some reason, he or she does not need to tilt the input device to a extent larger than necessary thereafter, thereby making it possible to improve the ease of operation.

According to the third aspect, the boundary angle gradually returns to the reference angle in the reduction step. Note that if a tilt angle remains unchanged and an output value changes in accordance with only a boundary angle being changed, the output value unexpectedly changes even though the user does not operate the input device, and therefore the user may feel awkward. On the contrary, according to the third aspect, the boundary angle is gradually changed, thereby reducing a change amount of the output value changed in accordance with the boundary angle being changed. Thus, it becomes possible not to cause the user to feel awkward.

In a fourth aspect, the boundary angle never becomes less than the tilt angle. Thus, it becomes possible to prevent the output value from becoming a value greater than a value within the predetermined range.

In a fifth aspect, by using the acceleration sensor, the tilt angle of the input device can be easily calculated.

According to the sixth aspect, the corrected acceleration which is corrected in the corrected step changes in accordance with the acceleration obtained from the acceleration sensor. Therefore, the corrected acceleration remains constant even when the obtained acceleration subtly changes, thereby making it possible to prevent an output value from being changed due to hand shake movement.

According to the seventh aspect, when the magnitude of the acceleration which is currently obtained is close to the magnitude of the gravitational acceleration, the corrected acceleration is calculated so as to be close to the magnitude of the acceleration. Therefore, in the case where the obtained acceleration is reliable (i.e., the acceleration accurately represents the tilt angle), the corrected acceleration is to be a value close to the obtained acceleration. Thus, it becomes possible to more accurately calculate the tilt angle by using the corrected acceleration.

According to the eight and ninth aspects, the acceleration represented by the three-dimensional vector is converted into an acceleration represented by the two-dimensional vector, thereby making it possible to easily execute a calculation process of the output value.

These and other objects, features, aspects and advantages of the illustrative implementations will become more apparent from the following detailed description of the present invention when taken in conjunction with the accompanying drawings.

BRIEF DESCRIPTION OF THE DRAWINGS

FIG. 3 is a perspective view illustrating an external configuration of a controller 5;

FIG. 4 is another perspective view illustrating the external configuration of the controller 5;

FIG. 7 is a block diagram illustrating a block diagram of a configuration of the controller 5;

DESCRIPTION OF THE PREFERRED EMBODIMENTS (Overall Configuration of Game System)

Figure 1:
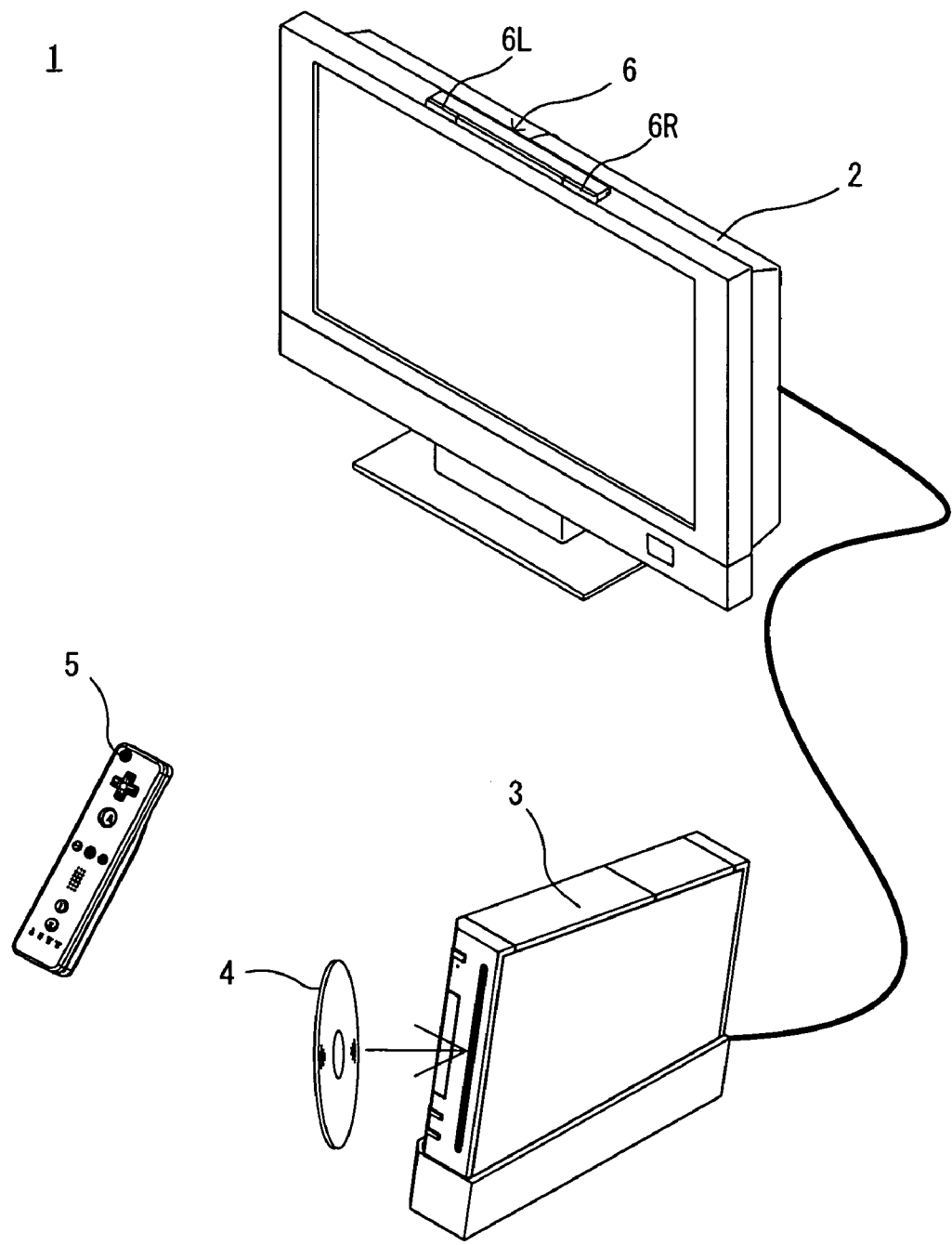
FIG. 1 is an external view of a game system 1.

With reference to FIG. 1, a game system 1 including a game apparatus, which is an exemplary information processing apparatus, according to an embodiment of the present invention will be described. FIG. 1 is an external view illustrating the game system 1. Hereinafter, the game apparatus and a game program of the present invention will be described by using a stationary game apparatus as an example. In FIG. 1, the game system 1 includes a television receiver (hereinafter simply referred to as "television") 2, a game apparatus 3, an optical disc 4, a controller 5, and a marker section 6. The present system causes the game apparatus 3 to execute a game processing in accordance with a game operation using the controller 5.

To the game apparatus 3, the optical disc 4, which is an exemplary information storage medium exchangeably used for the game apparatus 3, is detachably inserted. On the optical disc 4, a game program to be executed by the game apparatus 3 is stored. An insertion slot for the optical disc 4 is provided at the front face of the game apparatus 3. The game apparatus 3 executes the game processing by reading and executing the game program stored on the optical disc 4 inserted through the insertion slot.

To the game apparatus 3, the television 2, which is an exemplary display apparatus, is connected via a connection cord. The television 2 displays a game image obtained as a result of the game processing executed by the game apparatus 3. Further, on the periphery of a screen of the television 2 (an upper side of the screen in FIG. 1), the marker section 6 is provided. The marker section 6 has two markers 6R and 6L located at both ends thereof. The marker 6R (as well as the marker 6L) is specifically composed of one or more infrared LEDs, and outputs infrared light forward from the television 2. The marker section 6 is connected to the game apparatus 3, and the game apparatus 3 is capable of controlling lighting of respective infrared LEDs contained in the marker section 6.

The controller 5 is an input device for providing the game apparatus 3 with operation data representing a content of an operation applied to the controller 5. The controller 5 and the game apparatus 3 are connected to each other by wireless communication. In the present embodiment, a technique of Bluetooth (registered trademark), for example, is used for the wireless communication between the controller 5 and the game apparatus 3. In another embodiment, the controller 5 and the game apparatus 3 may be connected to each other via a fixed line.

(Internal Configuration of Game Apparatus 3)

Figure 2:
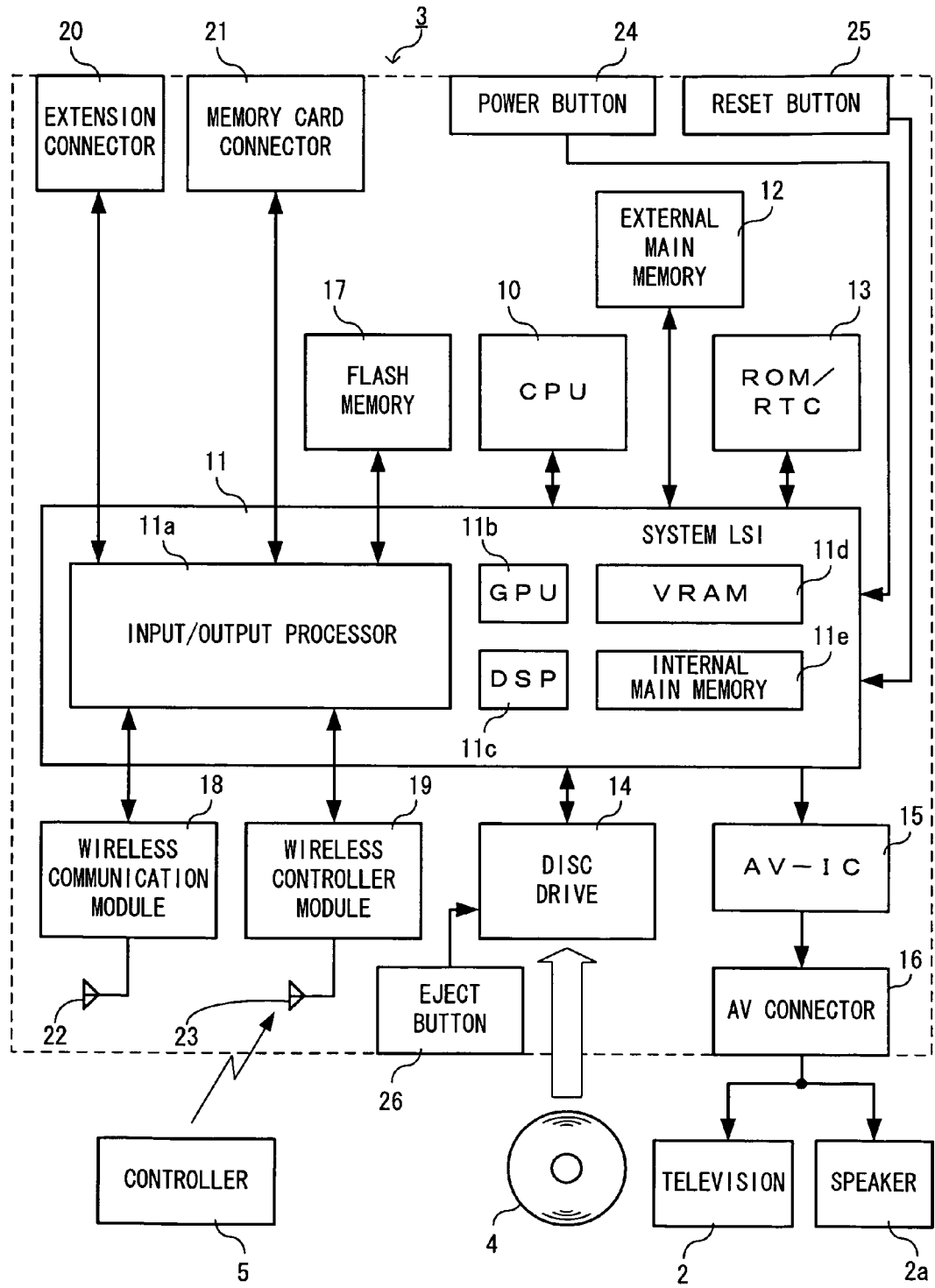
FIG. 2 is a functional block diagram of a game apparatus 3.
Figure 5:
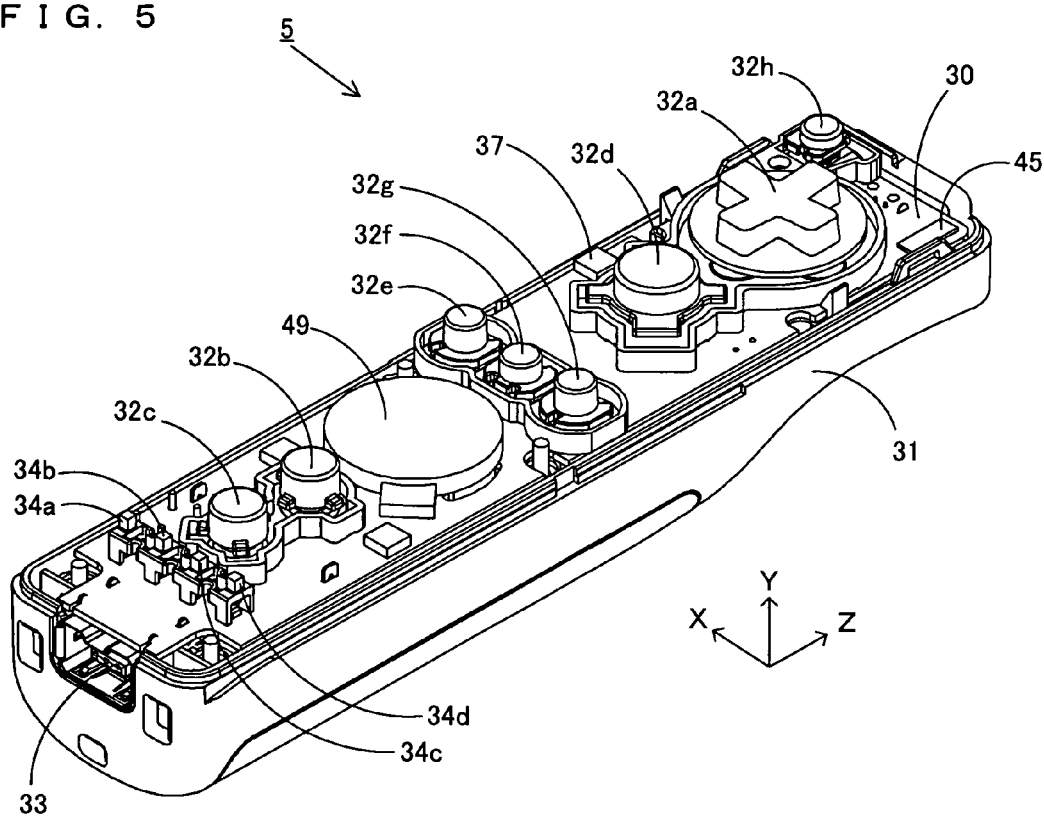
FIG. 5 is a view illustrating an internal configuration of the controller 5.

Next, with reference to FIG. 2, an internal configuration of the game apparatus 3 will be described. FIG. 2 is a block diagram illustrating a configuration of the game apparatus 3. The game apparatus 3 includes a CPU 10, a system LSI 11, an external main memory 12, a ROM/RTC 13, a disc drive 14, an AV-IC 15, and the like.

The CPU 10 executes the game processing by causing the game program stored on the optical disc 4 to be executed, and functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processing such as control of data transmission between respective component parts connected thereto, generation of an image to be displayed, and obtainment of data from an external apparatus. An internal configuration of the system LSI will be described later. The external main memory 12, which is of a volatile type, stores programs such as a game programs read from the optical disc 4 and the flash memory 17, and other various data, and is used as a work area and buffer space for the CPU 10. The ROM/RTC 13 includes a ROM (so-called a boot ROM) incorporating a program booting the game apparatus 3, and a clock circuit for counting time (RTC: Real Time Clock). The disc drive 14 reads, from the optical disc 4, the program data, texture data and the like, and writes the read data into an internal main memory 11e to be described later, or the external main memory 12.

Further, provided in the system LSI 11 are an input/output (I/O) processor 11a, a GPU (Graphics Processor Unit) 11b, a DSP (Digital Signal Processor) 11c, a VRAM 11d, and the internal main memory 11e. These component parts 11a to 11e are, though not shown in diagrams, connected to one another via an internal bus.

The GPU 11b forms a part of drawing means, and generates an image in accordance with a graphics command (draw command) from the CPU 10. The VRAM 11d stores data (such as polygon data and the texture data) necessary for the GPU 11b to execute the graphics command. When an image is generated, the GPU 11b generates the image data by using the data stored in the VRAM 11d.

The DSP 11c functions as an audio processor, and generates audio data by using sound data and sound waveform (tone quality) data stored in the internal main memory 11e and the external main memory 12.

The image data and the audio data generated as above described, is read by the AV-IC 15. The AV-IC 15 outputs the read image data to the television 2 via an AV connector 16, and also outputs the read audio data to a speaker 2a embedded in the television 2. Accordingly, the image is displayed on the television 2, and the sound is outputted from the speaker 2a.

The I/O processor 11a executes data transmission with component parts connected thereto and data downloading from an external apparatus. The I/O processor 11a is connected to the flash memory 17, a wireless communication module 18, a wireless controller module 19, an extension connector 20, and an external memory card connector 21. To the wireless communication module 18, an antenna 22 is connected, and to the wireless controller module 19, an antenna 23 is connected.

The I/O processor 11a is connected to a network via the wireless communication module 18 and the antenna 22, and is capable of communicating with other game apparatuses or various servers connected to the network. The I/O processor 11a accesses the flash memory 17 at regular intervals so as to detect data, if any, necessary to transmit to the network. If the data is detected, the detected data is transmitted to the network via the wireless communication module 18 and the antenna 22. Further, the I/O processor 11a receives data transmitted from the other game apparatuses or downloaded from a download server via the network, the antenna 22 or the wireless communication module 22, and stores the received data in the flash memory 17. The CPU 10 executes the game program so as to read the data stored in the flash memory 17 and causes the game program to use the read data. In the flash memory 17, not only the data transmitted and received between the game apparatus 3 and the other game apparatuses or the various servers, but also save data of a game (result data or intermediate step data of the game) played by using the game apparatus 3 may be stored.

Further, the I/O processor 11*a* receives the operation data transmitted from the controller 5 via the antenna 23 and the wired controller module 19, and (temporarily) stores the operation data in the internal main memory 11*e* or in a buffer space of the external main memory 12.

Further, to the I/O processor 11*a*, the extension connector 20 and the external memory card connector 21 are connected. The extension connector 20 is a connector for an interface such as a USB and a SCSI, and is capable of performing communication with the network, instead of the wireless communication module 18, by connecting thereto a medium such as an external storage, a peripheral device such as another controller, or a wired communication connector. The external memory card connector 21 is a connector for connecting the external storage medium such as the memory card. For example, the I/O processor 11*a* accesses the external storage medium via the extension connector 20 or the external memory card connector 21, and then saves data in the external storage medium or reads data from the external storage medium.

Provided to the game apparatus 3 are a power button 24, a reset button, 25, and an eject button 26. The power button 24 and the reset button 25 are connected to the system LSI 11. When the power button 24 is turned on, the power is supplied to the respective component parts of the game apparatus 3 via an AC adapter which is not shown. When the reset button 25 is pressed, the system LSI 11 reactivates a boot program of the game apparatus 3. The eject button 26 is connected to the disc drive 14. When the eject button 26 is pressed, the optical disc 4 is ejected from the disc drive 14.

(Configuration of Controller 5)

With reference to FIGS. 3 to 6, the controller 5 will be described. FIGS. 3 and 4 are perspective views illustrating an external configuration of the controller 5. FIG. 3 is a perspective view of the controller 5 as viewed from a top rear side thereof. FIG. 4 is a perspective view of the controller 5 as viewed from a bottom front side thereof.

In FIGS. 3 and 4, the controller 5 includes a housing 31 which is formed by, for example, plastic molding. The housing 31 has a substantially parallelepiped shape extending in a longitudinal direction from front to rear (a Z-axis direction shown in FIG. 3), and an overall size thereof is small enough to be held by one hand of an adult or even a child. A player can play a game by pressing buttons provided on the controller 5 or by moving the controller 5 itself so as to change a position or posture thereof.

The housing 31 includes a plurality of operation buttons. As shown in FIG. 3, on a top surface of the housing 31, a cross button 32*a*, a NO. 1 button 32*b*, a NO. 2 button 32*c*, an A button 32*d*, a minus button 32*e*, a home button 32*f*, a plus button 32*g* and a power button 32*h* are provided. In the following description, the top surface of the housing 31 having these buttons 32*a* to 32*h* provided thereon may be referred to as a "button surface". As shown in FIG. 4, on a bottom surface of the housing 31, a recessed portion is formed. On a rear side slope surface of the recessed portion, a B button 32*i* is provided. Various operational functions are assigned to the operation buttons 32*a* to 32*i* in accordance with the game program executed by the game apparatus 3. The power button 32*h* is a button for turning on and off the power to the game apparatus 3 by remote control. The home button 32*f* and the power button 32*h* have top surfaces thereof buried in the top surface of the housing 31 so as to prevent the home button 32*f* and the power button 32*h* from being mistakenly pressed by the player.

On a rear surface of the housing 31, a connector 33 is provided. The connector 33 is used for connecting the controller 5 to other devices (e.g., other controllers).

In a rear portion of the top surface of the housing 31, a plurality of LEDs (four in FIG. 3) 34*a* to 34*d* are provided. Note that a controller type (number) is assigned to the controller 5 such that the controller 5 is distinguishable from the other controllers 5. The LEDs 34*a* to 34*d* are used for, e.g., informing the player of the controller type which is currently set for the controller 5 or of a remaining battery charge of the controller 5. Specifically, when the game operation is performed using the controller 5, one of the plurality of LEDs 34*a* to 34*d* which corresponds to the controller type of the controller 5 is lit up.

Furthermore, the controller 5 has an imaging information calculation section 35 (FIG. 5B). As shown in FIG. 4, on a front surface of the housing 31, a light incident surface 35*a* included in the imaging information calculation section 35 is provided. The light incident surface 35*a* is formed by a material which allows at least an infrared radiation incident from the markers 6R and 6L to pass through.

A speaker hole 31*a* for emitting a sound from a speaker 49 (FIG. 5A) embedded in the controller 5 to outside is formed between the NO. 1 button 32*b* and the home button 32*f* provided on the top surface of the housing 31.

With reference to FIGS. 5A and 5B, an internal configuration of the controller 5 will be described. FIGS. 5A and 5B are views illustrating the internal configuration of the controller 5. Note that FIG. 5A is a perspective view of the controller 5 in a state where an upper casing (a part of the housing 31) of the controller 5 is removed. FIG. 5B is a perspective view of the controller 5 in a state where a lower casing (a part of the housing 31) of the controller 5 is removed. FIG. 5B is a perspective view of a substrate 30 as viewed from a reverse side of the substrate 30 shown in FIG. 5A.

As shown in FIG. 5A, the substrate 30 is fixed inside the housing 31. Provided, on a top main surface of the substrate 30, are the operation buttons 32*a* to 32*h*, the LEDs 34*a* to 34*d*, an acceleration sensor 37, an antenna 45, the speaker 49 and the like. These elements are connected to a microcomputer (Micro Computer) 42 (see FIG. 5B) by lines (not shown) formed on the substrate 30 or the like. In the present embodiment, the acceleration sensor 37 is located at a position displaced from the center of the controller 5 with respect to an X-axis direction. Thus, a motion of the controller 5 when being rotated about a Z-axis is more easily calculated. Furthermore, the acceleration sensor 37 is located in front of the center of the controller 5 with respect to the longitudinal direction (the Z-axis direction). A wireless module 44 (FIG. 6) and the antenna 45 allow the controller 5 to act as a wireless controller.

As shown in FIG. 5B, at a front edge of a bottom main surface of the substrate 30, the imaging information calculation section 35 is provided. The imaging information calculation section 35 includes an infrared filter 38, a lens 39, an image pickup element 40 and an image processing circuit 41 which are located in this order from the front side of the controller 5. These elements 38 to 41 are attached to the bottom main surface of the substrate 30.

Furthermore, on the bottom main surface of the substrate 30, the microcomputer 42 and a vibrator 48 are attached. The vibrator 48 may be, for example, a vibration motor or a solenoid. The vibrator 48 is connected to the microcomputer 42 by the lines formed on the substrate 30 or the like. The controller 5 is vibrated when the vibrator 48 is turned on in accordance with an instruction from the microcomputer 42. Thus, a so-called vibration-feedback game in which vibration is conveyed to the player holding the controller 5 is realized. In the present embodiment, the vibrator 48 is located at a relatively front side of the housing 31. That is, the vibrator 48 is located at a position displaced from the center of the controller 5 toward one end thereof, thereby allowing the vibration generated by the vibrator 48 to vibrate the overall controller 5 to a large extent. At a rear edge of the bottom main surface of the substrate 30, the connector 33 is attached. Although not shown in FIGS. 5A and 5B, the controller 5 further includes a quartz oscillator for generating a reference clock of the microcomputer 42, an amplifier for outputting an audio signal to the speaker 49, and the like.

Note that a shape of the controller 5, shapes of the operation buttons, and the number or mounted positions of the acceleration sensors or vibrators, all of which are shown in FIGS. 3 to 5A and 5B, are merely examples. The present invention can be realized by using other shapes, numbers and mounted positions for the aforementioned elements. Further, in the present embodiment, an imaging direction in which imaging means picks up an image is a Z-axis positive direction. However, the imaging direction may be any other directions. In other words, the imaging information calculation section 35 (the light incident surface 35a of the imaging information calculation section 35) of the controller 5 may not be provided on the top surface of the housing 31. The imaging information calculation section 35 (the light incident surface 35a) may be provided on other surfaces of the housing 31 only if the element can capture a light from outside the housing 31.

Figure 6:
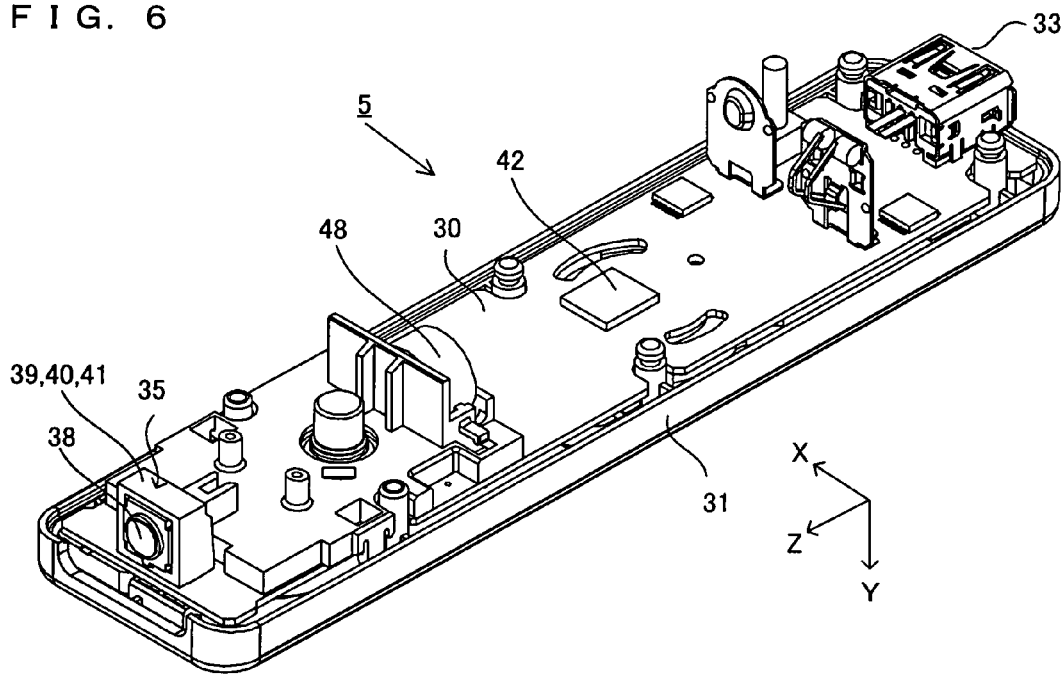
FIG. 6 is another view illustrating the internal configuration of the controller 5.

FIG. 6 is a block diagram illustrating a configuration of the controller 5. The controller 5 includes an operation section 32 (the operation buttons 32a to 32i), the connector 33, the imaging information calculation section 35, the communication section 36 and the acceleration sensor 37. The controller 5 provides the game apparatus 3 with data representing a content of an operation applied to the controller 5 as the operation data.

The operation section 32 includes the above-described operation buttons 32a to 32i, and outputs operation button data representing an input state of each of the operation buttons 32a to 32i (i.e., representing whether or not each of the operation buttons 32a to 32i is pressed) to the microcomputer 42 of the communication section 36.

The imaging information calculation section 35 is a system for analyzing image data picked up by the imaging means, thereby identifying an area having a high brightness in the image data and calculating a position of a gravity center, a size and the like of the area. The imaging information calculation section 35 has, for example, a maximum sampling period of about 200 frames/sec, and therefore can trace and analyze even a relatively fast motion of the controller 5.

The imaging information calculation section 35 includes the infrared filter 38, the lens 39, the image pickup element 40 and the image processing circuit 41. The infrared filter 38 allows only an infrared radiation in the light incident on the front side of the controller 5 to pass therethrough. The lens 39 converges the infrared radiation which has passed through the infrared filter 38, and outputs the infrared radiation to the image pickup element 40. The image pickup element 40 is a solid-state image pickup element such as a CMOS sensor or a CCD, and outputs an image signal by receiving the infrared radiation collected by the lens 39. Note that the markers 6R and 6L, located on the periphery of the display screen of the television 2, are infrared LEDs which output infrared light forward from the television 2. Therefore, the infrared filter 38 allows the image pickup element 40 to pick up the image of only the infrared radiation which has passed through the infrared filter 38, and to generate image data. Thus, images of the respective markers 6R and 6L can be more accurately picked up. Hereinafter, an image picked up by the image pickup element 40 is referred to as a "picked up image". The image data generated by the image pickup element 40 is processed by the image processing circuit 41. The image processing circuit 41 calculates positions of objects to be picked up (i.e., the markers 6R and 6L) included in the picked up image. The image processing circuit 41 outputs coordinates representing the calculated positions to the microcomputer 42 of the communication section 36. The microcomputer 42 transmits data representing the coordinates to the game apparatus 3 as the operation data. Hereinafter, the aforementioned coordinates are referred to as "marker coordinates". The marker coordinates vary depending on a direction (tilt angle) or a position of the controller 5, and thus the game apparatus 3 can calculate the direction or the position of the controller 5 by using the marker coordinates.

The acceleration sensor 37 detects acceleration (including gravitational acceleration) of the controller 5. In other words, the acceleration sensor 37 detects force (including gravity) applied to the controller 5. The acceleration sensor 37 detects, from acceleration applied to a detector of the acceleration sensor 37, only a value of acceleration along a straight line (linear acceleration) corresponding to each axis of the acceleration sensor. For example, in the case of a multi-axial acceleration sensor detecting acceleration along two or more axes, a component of acceleration along each of the two or more axes is detected as acceleration applied to the detector of the acceleration sensor 37. For example, a triaxial or biaxial acceleration sensor may be of a type available from Analog Devices, Inc. or STMicroelectronics N.V. The acceleration sensor 37 may be of an electrostatic capacitance (capacitance-coupling) type. However, the acceleration sensor 37 of any other type may be used.

In the present embodiment, the acceleration sensor 37 detects linear acceleration in three directions, i.e., an up-down direction (a Y-axis direction shown in FIG. 3), a left-right direction (the X-axis direction shown in FIG. 3) and a front-rear direction (the Z-axis direction shown in FIG. 3) with respect to the controller 5. Since the acceleration sensor 37 detects acceleration along a straight line corresponding to each of the three axes, the output of the acceleration sensor 37 represents values of linear acceleration along the three respective axes. Specifically, the detected acceleration is represented by a three-dimensional vector (AX, AY, AZ) in a XYZ coordinate system which is set with respect to the controller 5. Hereinafter, a vector having three components as the values of acceleration along the three respective axes detected by the acceleration sensor 37 is referred to as an "acceleration vector".

Data representing acceleration detected by the acceleration sensor 37 (acceleration data) is outputted to the communication section 36. Note that the acceleration detected by the acceleration sensor 37 varies depending on the direction (tilt angle) or a motion of the controller 5, and thus the game apparatus 3 is capable of calculating the direction or the motion of the controller 5 by using the acceleration data. In the present embodiment, the game apparatus 3 determines the posture of the controller 5 based on the acceleration data.

The data representing the acceleration (the acceleration vector) detected by the acceleration sensor 37 (the acceleration data) is outputted to the communication section 36. In the present embodiment, the acceleration sensor 37 is used as a sensor for outputting data for determining the tilt angle of the controller 5.

Note that through processing by a computer such as a processor of the game apparatus 3 (e.g., the CPU 10) or a processor of the controller 5 (e.g., the microcomputer 42), in accordance with acceleration signals outputted from the acceleration sensor 37, additional information relating to the controller 5 can be inferred or calculated (determined), as one skilled in the art will readily understand from the description herein. For example, in the case where processing is performed by a computer based on the assumption that the controller 5 accommodating the acceleration sensor 37 is in a static state (that is, in the case where it is only gravitational acceleration that is to be detected by the acceleration sensor), it is possible to understand whether or not, or to what extent, the controller is tilted toward the gravity direction in accordance with the detected acceleration as long as the controller is actually in a static state. Specifically, if a state where an axis to be detected by the acceleration sensor 37 is facing a vertically downward direction is set as a reference state, it is possible to find out whether or not the axis to be detected is tilted depending on whether or not 1 G (gravitational acceleration) is exerted, and also possible to find out the degree of tilt of the axis to be detected. Further, in the case of the multi-axial acceleration sensor 37, it is possible to find out, in detail, the degree of tilt of respective axes with respect to the gravity direction by processing the acceleration signals along the respective axes. In this case, the processor may calculate data of a tilt angle of the controller 5 in accordance with the output from the acceleration sensor 37, or alternatively infer an approximate tilt angle in accordance with the output from the acceleration sensor 37 without calculating data of the tilt angle. By using the acceleration sensor 37 and the processor in combination with each other in a manner as above described, it is possible to identify a tilt angle and a posture of the controller 5.

On the other hand, in the case where it is assumed that the controller 5 is in a dynamic state (that is, in the case where the controller 5 is being moved), the acceleration sensor 37 detects acceleration corresponding to the motion of the controller 5, in addition to gravitational acceleration. Thus, if a component of the gravitational acceleration is removed from the detected acceleration through given processing, it is possible to calculate a motion direction of the controller 5. Even in the case where it is assumed that the controller 5 is in the dynamic state, it is possible to calculate a tilt of the controller 5 toward the gravity direction if a component of the acceleration corresponding to the motion of the acceleration sensor is removed from the detected acceleration through given processing. In another embodiment, the acceleration sensor 37 may include a built-in type signal processing apparatus or a dedicated processing apparatus of any other type so as to perform given processing on the acceleration signal detected by an embedded accelerometer before outputted to the microcomputer 42. For example, in the case where the acceleration sensor 37 is designed to detect static acceleration (e.g., gravitational acceleration), the built-in type or the dedicated processing apparatus may convert the detected acceleration signal into a tilt angle (or any other desirable parameter) corresponding thereto.

In the present embodiment, as the sensor for outputting a value varied in accordance with the motion of the controller 5, an acceleration sensor of an electrostatic capacitance type is used. However, an acceleration sensor or gyro-sensor of any other type may be used. Note that while the acceleration sensor is capable of detecting acceleration along a straight line corresponding to each axis, the gyro-sensor is capable of detecting an angular rate of rotation about each axis. That is, in the case where the acceleration sensor is replaced with the gyro-sensor, characteristics of a signal detected by the gyro-sensor are different from those detected by the acceleration sensor. Thus, the acceleration sensor and the gyro-sensor cannot be easily replaced with each other. In the case where the posture (tilt angle) is calculated by using the gyro-sensor instead of the acceleration sensor, the following change is performed, for example. Specifically, in the case of using the gyro-sensor, the game apparatus 3 initializes a value of the posture at the time of starting detection. The angular rate data outputted from the gyro-sensor is integrated. Based on an integration result, variation in posture is then calculated from the initialized value of the posture. In this case, the posture to be calculated is represented by the angle.

As already described above, in the case of using the acceleration sensor to calculate the tilt angle (posture), the posture is calculated by using the acceleration vector. Therefore, different from the gyro-sensor, the posture to be calculated can be represented by a vector, and thus an absolute direction can be detected without performing initialization. Further, a type of the value detected as a tilt angle is represented by the angle in the case of using the gyro-sensor, and is represented by the vector, on the other hand, in the case of using the acceleration sensor. Therefore, in the case of using the gyro-sensor instead of the acceleration sensor, data of the tilt angle also needs to be converted in an appropriate manner.

The communication section 36 includes the microcomputer 42, a memory 43, the wireless module 44 and the antenna 45. The microcomputer 42 controls the wireless module 44 for wirelessly transmitting data obtained by the microcomputer 42 while using the memory 43 as a storage area at the time of processing.

Data outputted from the operation section 32, the imaging information calculation section 35 and the acceleration sensor 37 to the microcomputer 42 is temporarily stored in the memory 43. The data is then transmitted to the game apparatus 3 as the operation data. Specifically, at a timing of performing a wireless transmission to the wireless controller module 19 of the game apparatus 3, the microcomputer 42 outputs the operation data stored in the memory 43 to the wireless module 19. The wireless module 44 uses, for example, the Bluetooth (registered trademark) technology so as to modulate the operation data by using a carrier wave having a predetermined frequency and to emit the modulated weak radio signal from the antenna 45. That is, the wireless module 44 modulates the operation data into a weak radio signal so as to be transmitted from the controller 5. The weak radio signal is received by the wireless controller module 19 of the game apparatus 3. The game apparatus 3 demodulates or decodes the received weak radio signal to obtain the operation data. In accordance with the obtained operation data and the game program, the CPU 10 of the game apparatus 3 executes the game processing. Wireless transmission from the communication section 36 to the wireless controller module 19 is performed at predetermined time intervals. Since the game processing is generally executed at a cycle of 1/60 sec (one frame period), it is preferable that the wireless transmission needs to be performed at a cycle of a shorter time period. The communication section 36 of the controller 5 outputs the operation data to the wireless controller module 19 of the game apparatus 3 every 1/200 sec, for example.

In addition to a general game operation such as pressing the operation buttons, the controller 5 allows the player to perform an operation of tilting the controller 5 at any tilt angle by using the controller 5. Furthermore, the player can also perform an operation of pointing to any position on the screen and an operation of moving the controller 5 itself by using the controller 5.

(Outline of Game Processing Executed by Game Apparatus 3)

Next, with reference to FIGS. 8 to 11, an outline of the game processing executed by the game apparatus 3 will be described. In the present embodiment, the player performs an operation of tilting the controller 5, and the game apparatus 3 calculates an output value in accordance with a tilt angle of the controller 5 so as to execute the game processing using the calculated output value. Hereinafter, the game processing executed by the game apparatus 3 will be described, mainly with respect to processes of calculating a tilt angle of the controller 5 and further calculating an output value based on the tilt angle having been calculated.

Figure 8:
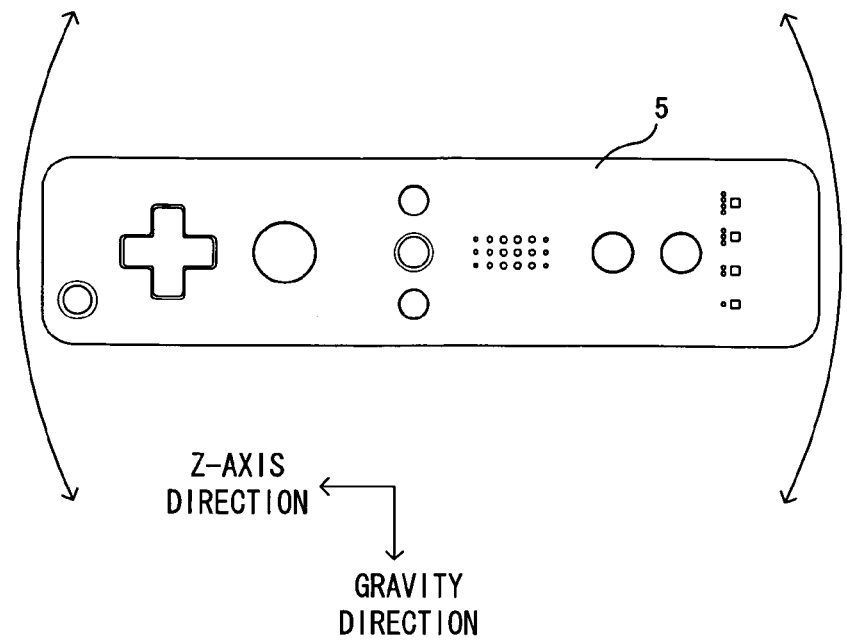
FIG. 8 is a diagram describing an operation method of the controller 5.

Firstly, the process of calculating a tilt angle of the controller 5 will be described. FIG. 8 is a diagram describing an operation method of the controller 5 according to the present embodiment. The game apparatus 3 calculates a tilt angle of the controller 5 based on an acceleration vector detected by the acceleration sensor 37. Specifically, the tilt angle of the controller 5 indicates a magnitude of tilt from a state where the controller 5 is in a predetermined posture (i.e., a reference state to be described later in the present embodiment). The details of a calculation method of a tilt angle will be described later. In the present embodiment, the game apparatus 3 calculates an angle formed by a plane perpendicular to the Z-axis and the gravity direction as a tilt angle of the controller 5. Therefore, the player may move the controller 5 in the directions indicated by arrows shown in FIG. 8, for example, thereby operating the controller 5 so as to change the angle formed by the controller 5 and the gravity direction. Typically, the player holds a front end (an end of the Z-axis positive direction) and a rear end (an end of the Z-axis negative direction) of the controller 5 and performs an operation such that the controller 5 turns in the directions indicated by the arrows of FIG. 8. Note that the present embodiment assumes that the player holds the front end of the controller 5 in a left hand, and holds the rear end of the controller 5 in a right hand. Furthermore, it is also assumed that the player performs an operation holding the controller 5 in such a manner that thumbs of the player can be in contact with the button surface, in order to press the operation buttons provided on the button surface while holding the controller 5.

As described above, in the present embodiment, the game apparatus 3 calculates the angle formed by the plane perpendicular to the Z-axis and the gravity direction as a tilt angle of the controller 5. In another embodiment, the game apparatus 3 may calculate any angle as a tilt angle of the controller 5. For example, as a tilt angle of the controller 5, the game apparatus 3 may use an angle formed by the gravity direction and an X-axis, or an angle formed by the gravity direction and a Y-axis.

Figure 9:
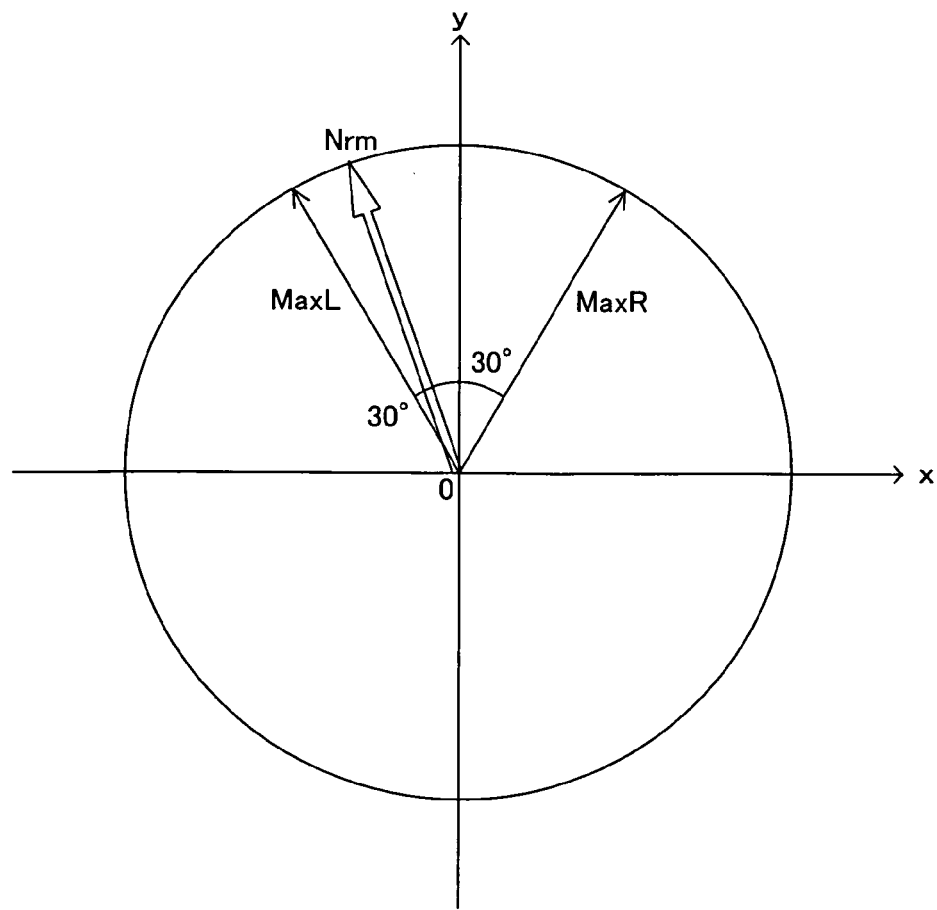
FIG. 9 is a diagram in which a tilt angle calculated by the game apparatus 3 is represented by a two-dimensional vector.

FIG. 9 is a diagram in which a tilt angle calculated by the game apparatus 3 is represented by a two-dimensional vector. In the present embodiment, as shown in FIG. 9, the tilt angle calculated by the game apparatus 3 is represented by a two-dimensional vector Nrm in an xy coordinate system. Hereinafter, a vector representing the tilt angle is referred to as a "tilt angle vector". The tilt angle vector Nrm is a two-dimensional vector having a start point at an origin of the xy coordinate system, and also is a unit vector having a length of 1. The tilt angle is represented as an angle formed by a y-axis positive direction and the tilt angle vector Nrm (the angle may be simply referred to as "an angle of a tilt angle vector"). Note that in the present embodiment, when an angle formed by the plane perpendicular to the Z-axis and the gravity direction is 0°, the controller 5 is in a reference state. The tilt angle vector Nrm is calculated such that the tilt angle vector Nrm faces the y-axis positive direction when the controller 5 is in the reference state, the tilt angle vector Nrm turns toward an x-axis positive direction when the controller 5 is turned to one direction (other than a direction centered about the Z-axis) from the reference state, and the tilt angle vector Nrm turns toward an x-axis negative direction when the controller 5 is turned to an opposite direction to the one direction from the reference state. As such, the tilt angle vector Nrm represents toward which direction, or to what extent, the controller 5 is tilted from the reference state. In the present embodiment, when an x component of the tilt angle vector Nrm is a positive value, it is determined that "the controller 5 is tilted to the right". On the other hand, when the x component of the tilt angle vector Nrm is a negative value, it is determined that "the controller 5 is tilted to the left". The game apparatus 3 calculates the tilt angle vector Nrm based on the acceleration vector mentioned above. The detailed calculation method of the tilt angle vector Nrm will be described later.

Next, the process of calculating an output value based on a tilt angle will be described. After calculating the tilt angle, the game apparatus 3 further calculates an output value based on the tilt angle having been calculated. In the present embodiment, in order to calculate an output value with a limit assigned to an allowable range thereof, a boundary angle is used. The boundary angle indicates a tilt angle obtained when an output value is equal to a boundary value of the range. Similarly to a tilt angle, a boundary angle is also represented by a two-dimensional vector in the xy coordinate system. The game apparatus 3 stores a first boundary angle vector MaxL and a second boundary angle vector MaxR as a vector representing the boundary angle (see FIG. 9). In the present embodiment, a tilt angle obtained when the controller 5 is turned to one direction from the reference state is distinguished from a tilt angle obtained when the controller 5 is turned to an opposite direction to the one direction. Thus, the game apparatus 3 prepares two vectors of the first boundary angle vector MaxL and the second boundary angle vector MaxR as the vector representing the boundary angle.

In the present embodiment, an output value is calculated so as to be greater in proportion to the magnitude of tilt measured from the reference state. Such an output value can be used as a value indicating a turning angle of a steering wheel in a car racing game, for example. Although the details will be described later, an output value is calculated as a ratio of a tilt angle to a boundary angle. Therefore, a limit is assigned to an allowable range of the output value, and when a tilt angle is equal to a boundary angle, an output value becomes the boundary value of the range.

A reference angle is set for the boundary angle. In the present embodiment, a reference angle of a first boundary angle is a first reference angle, and a reference angle of a second boundary angle is a second reference angle. As shown in FIG. 9, the present embodiment assumes that each of the reference angles is 30°. Specifically, a reference vector of the first boundary angle vector MaxL is represented as (−0.5, 0.866), and a reference vector of the second boundary angle vector MaxR is represented as (0.5, 0.866).

Figure 10:
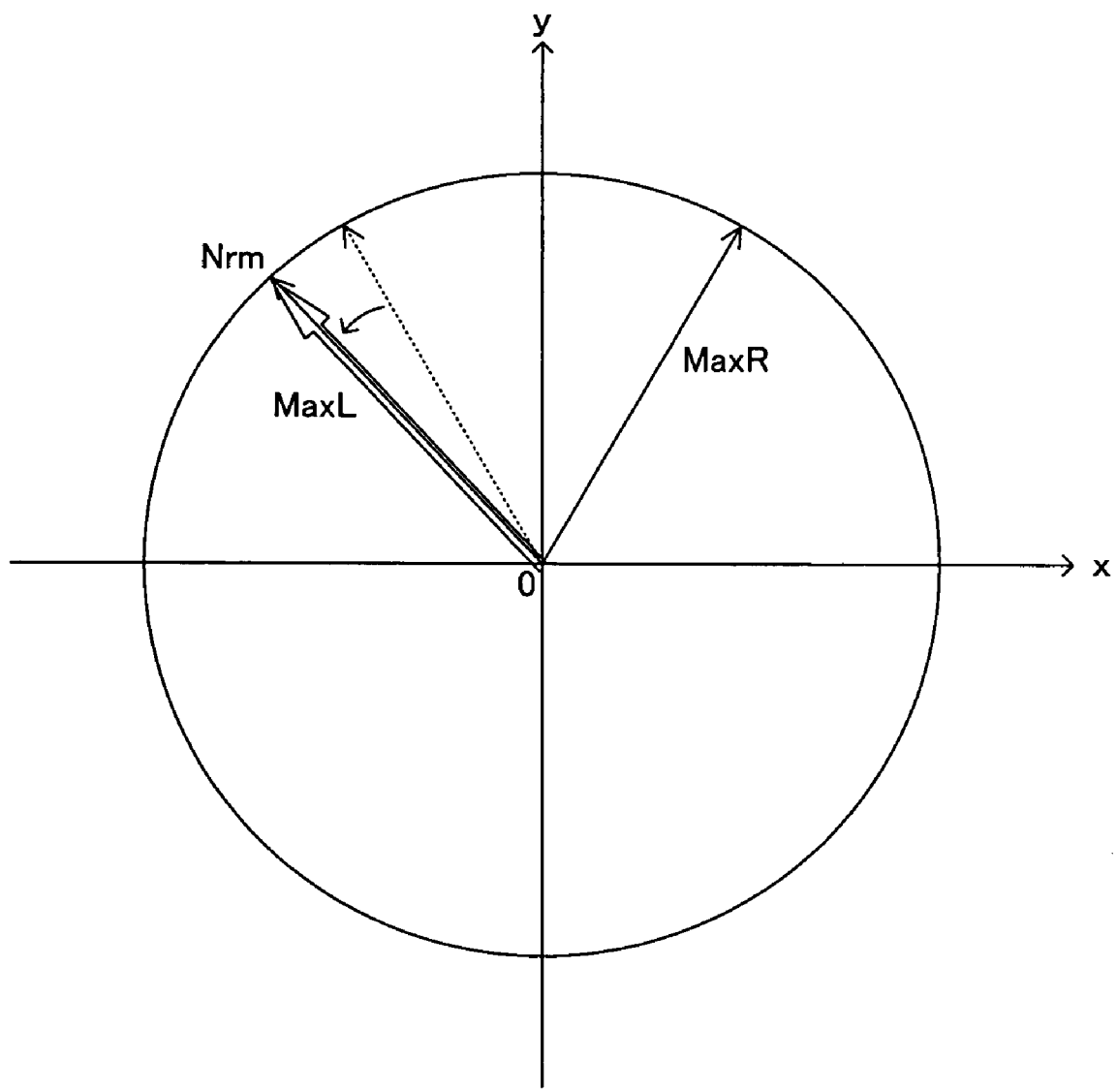
FIG. 10 is a diagram illustrating a state where a boundary angle vector changes.

Note that the boundary angle is not fixedly set as the aforementioned reference angle. Instead, the boundary angle is set so as to be variable in accordance with a tilt angle calculated from an acceleration vector. FIG. 10 is a diagram illustrating a state where a boundary angle vector changes. As shown in FIG. 10, the boundary angle vector (i.e., the first boundary angle vector MaxL in FIG. 10) is updated to a value equal to a tilt angle vector Nrm when an angle of the tilt angle vector Nrm becomes greater than an angle of the reference vector (shown by a dotted line in FIG. 10) of the boundary angle vector. The game apparatus 3 calculates an output value by using the boundary angle vector having been updated.

As described above, according to the present embodiment, the boundary angle is set so as to be variable in accordance with the tilt angle, thereby making it possible to improve an ease of operation of the controller 5. In the present embodiment, since the player can tilt the controller 5 at any tilt angle, a tilt angle of the controller 5 may become greater than the reference angle of the boundary angle. In such a case, according to the present embodiment, the boundary angle is updated to a value equal to the tilt angle, and an output value is calculated based on a ratio of the tilt angle to the boundary angle having been updated. By calculating an output value in such a manner as described above, the output value is always calculated based on a tilt angle even if the tilt angle becomes greater than the reference angle of the boundary angle. Therefore, a value of the tilt angle would never be ignored. Thus, no matter what angle the player tilts the controller 5 at, an operation applied to the controller 5 always reflects an output value, thereby avoiding a problem that an output value remains unchanged even if an operation is applied to the controller 5. Accordingly, the ease of operation can be improved.

For example, let us assume that an output value is applied to a turning angle of a steering wheel in a car racing game. In this case, it is assumed that while the player usually performs an operation by tilting the controller 5 at a moderate angle (i.e., at up to around the reference angle), he or she may tilt the controller 5 at an angle steeper than necessary (i.e., at an angle greater than the reference angle) when performing an operation of turning the steering wheel abruptly at a time of negotiating a sharp turn, for example. In this case, if it is supposed that a boundary angle is fixedly set as a reference angle, a tilt angle would not reflect an output value during a time period from when the player substantially tilts the controller 5 at an angle greater than the reference angle to when the player returns the controller 5 such that a tilt angle thereof becomes an angle equal to or less than the reference angle. Thus, an operation applied to the controller 5 would not reflect the game during the aforementioned time period, whereby the operation would be more difficult to perform. On the contrary, according to the present embodiment, with a boundary angle set to be variable, an output value changes in accordance with an operation applied to the controller 5 even during the aforementioned time period. Thus, the operation does reflect the game, thereby making it possible to provide the player with satisfactory operation feelings.

Furthermore, to what extent the player should tilt the controller 5 to make him or her feel that an operation is easy to perform, that is, an appropriate boundary angle that makes the player feel that an operation is easy to perform is different from player to player. Therefore, in a method in which a boundary angle is fixedly set, a boundary angle appropriate for all players cannot be set, and therefore it is impossible to realize an ease of operation which is satisfactory to all the players. On the contrary, according to the present embodiment, a boundary angle is set so as to be variable in accordance with an actual tilt angle of the controller 5, thereby making it possible to set a boundary angle appropriate for each player. Thus, the ease of operation which is satisfactory to all players can be realized.

Figure 11:
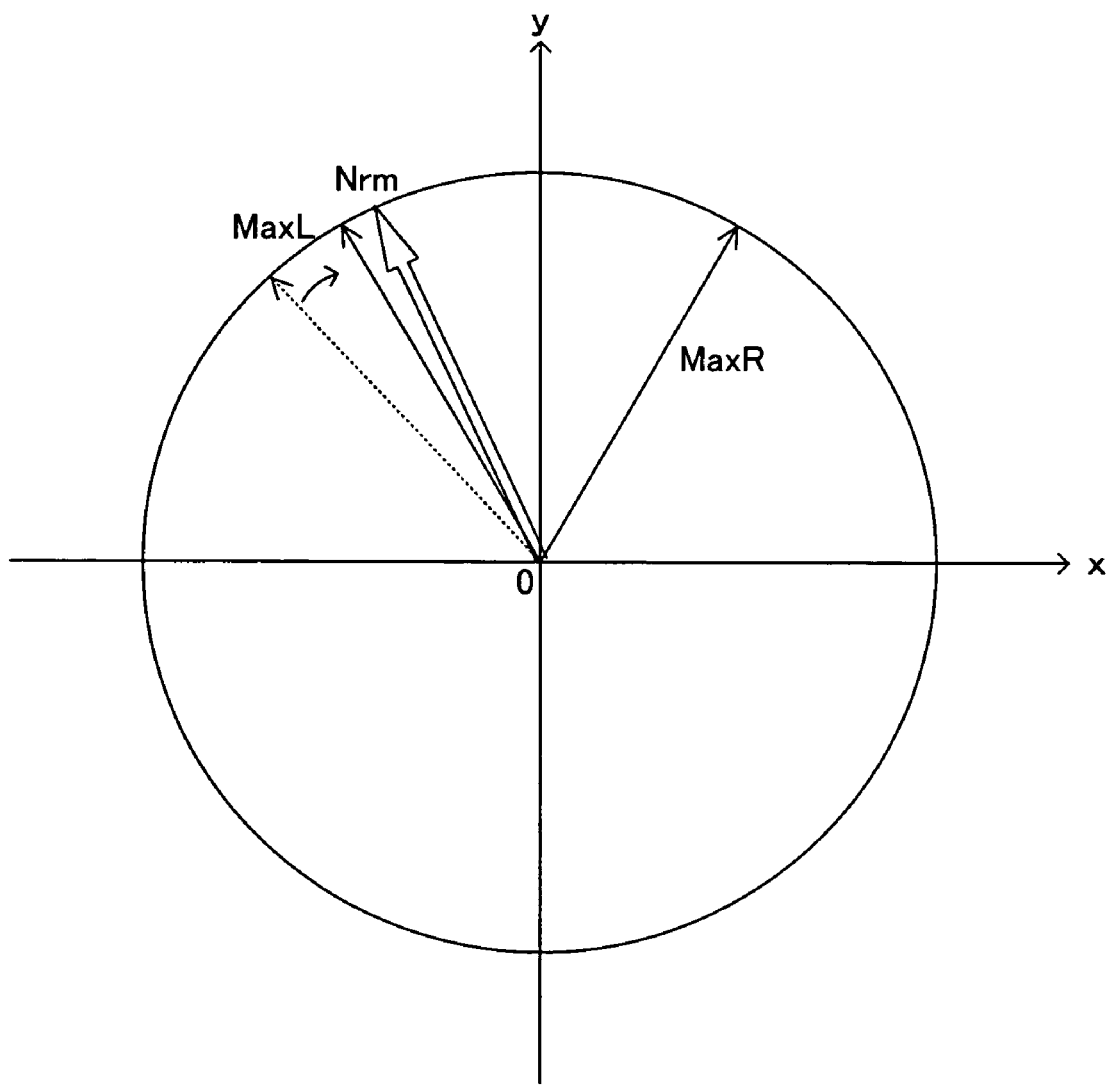
FIG. 11 is a diagram illustrating a state where the boundary angle vector returns to a reference angle which has been originally set.

Furthermore, in the present embodiment, in addition to a process of increasing a boundary angle when a tilt angle becomes greater than a reference angle (a first update process to be described later (step S5)), the game apparatus 3 executes a process of returning (decreasing) the boundary angle to the reference angle (a second update process to be described later (step S6)). FIG. 11 is a diagram illustrating a state where the boundary angle vector returns to the reference angle which has been originally set. After a boundary angle increases in accordance with a tilt angle (FIG. 10), the boundary angle decreases to the reference angle when the tilt angle becomes less than the boundary angle. Specifically, in this case, the game apparatus 3 returns the boundary angle vector (the first boundary angle vector MaxL in FIG. 11) to the reference vector, as shown in FIG. 11. Although the details will be described later, the boundary angle vector is returned to the reference vector at a constant speed (i.e., by a predetermined angle per a predetermined time period). In this case, the boundary angle vector is returned such that an angle of the boundary angle vector does not become less than the tilt angle.

As described above, the process of returning the boundary angle is executed, thereby making it possible to improve the ease of operation of the controller 5. Note that if it is supposed that the process of returning the boundary angle is not executed, a boundary angle becomes greater each time the tilt angle exceeds the boundary angle. In a state where the boundary angle becomes greater each time the tilt angle exceeds the boundary angle, the player must tilt the controller 5 to a large extent since an output value stays equal to a boundary value. Thus, if it is supposed that the process of returning the boundary angle is not executed, the player must perform an operation by tilting the controller to a larger extent as he or she performs the game operation, whereby the operation would be more difficult to perform. For example, once the player tilts the controller 5 at an angle steeper than necessary (i.e., at an angle greater than the reference angle) for some reason, he or she must always perform an operation by tilting the controller 5 to a large extent thereafter. This is because unless the controller 5 is tilted to a large extent, an output value equal to a boundary value cannot be obtained. As a state where the player tilts the controller 5 at an angle steeper than necessary, a state where the controller 5 needs to be tilted suddenly (specifically, a state where when applying an output value to a turning angle of a steering wheel in a car racing game, an operation of turning the steering wheel abruptly in order to negotiate a sharp turn is performed) or a state where an operation performed by the player becomes extreme since he or she gets too much involved in the game may be considered, for example.

On the contrary, in the present embodiment, even when the game apparatus 3 increases a boundary angle, the game apparatus 3 returns the boundary angle to the reference angle if a tilt angle decreases after the boundary angle is increased. Therefore, even when the player tilts the controller 5 at an angle steeper than necessary (i.e., at an angle greater than the reference angle) for some reason, he or she does not need to tilt the controller 5 to a large extent thereafter, thereby making it possible to improve the ease of operation.

(Details of Game Processing Executed by Game Apparatus 3)

Figure 12:
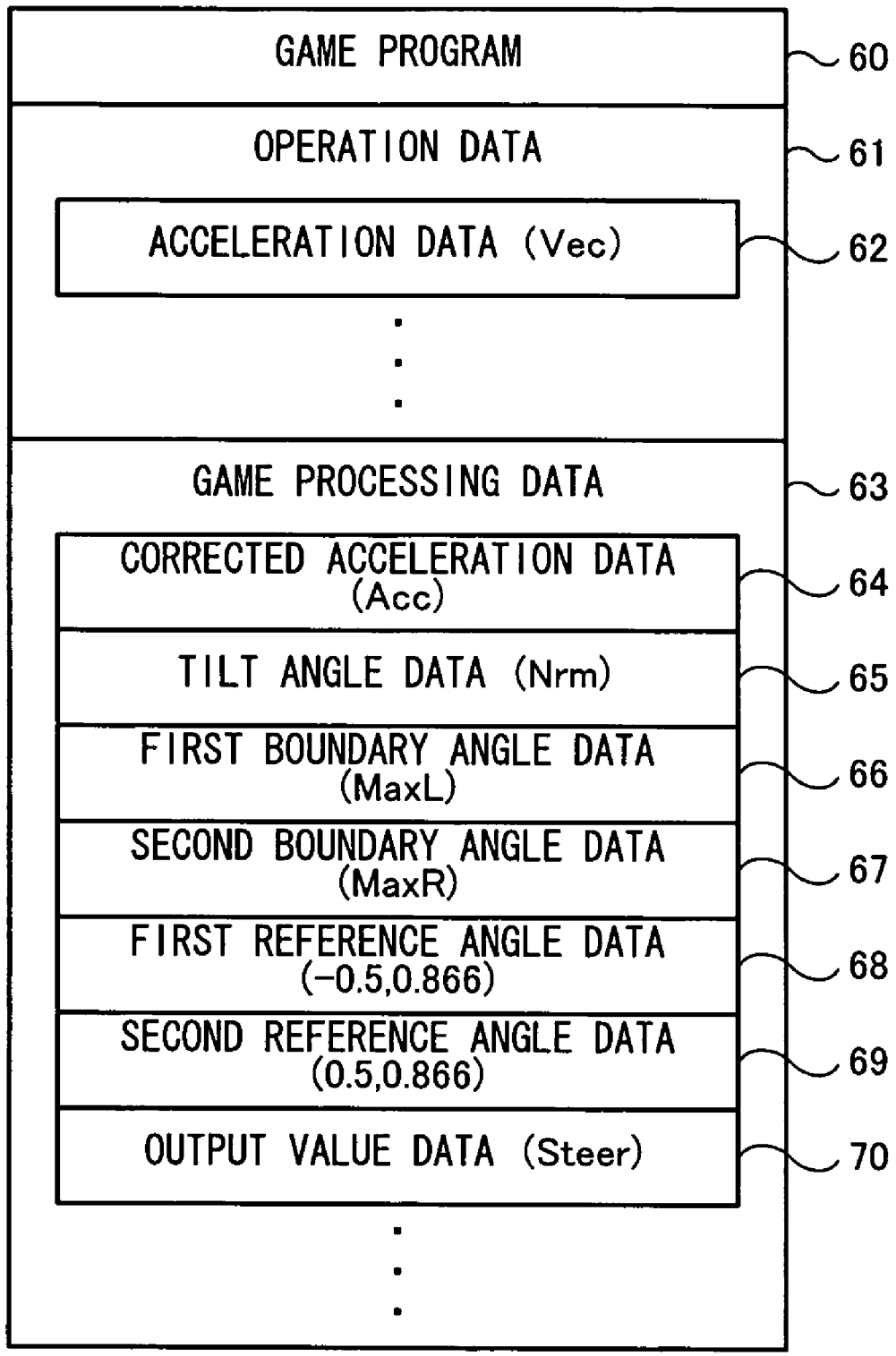
FIG. 12 is a diagram illustrating main data stored in a main memory of the game apparatus 3.

Next, the game processing executed by the game apparatus 3 will be described in detail. With reference to FIG. 12, main data used for the game processing executed by the game apparatus 3 will be described. FIG. 12 is a diagram illustrating the main data stored in the main memory (the external main memory 12 or the internal main memory 11e) of the game apparatus 3. As shown in FIG. 12, a game program 60, operation data 61 and game processing data 63 are stored in the main memory of the game apparatus 3. Note that in addition to the data shown in FIG. 12, data necessary for the game processing such as image data of various objects appearing in the game, data indicating various parameters of the objects and the like are stored in the main memory.

A portion or an entirety of the game program 60 is loaded from the optical disc 4 at an appropriate timing after the game apparatus 3 is powered on, and the loaded game program is stored in the main memory. The game program 60 includes a program for calculating a tilt angle of the controller 5 and then further calculating an output value based on the tilt angle.

The operation data 61 is the operation data transmitted from the controller 5 to the game apparatus 3. As described above, the operation data is transmitted from the controller 5 to the game apparatus 3 every 1/200 sec, and thus the operation data stored in the main memory is updated at the same rate. In the present embodiment, most recent (most recently received) operation data is only necessary to be stored in the main memory.

The operation data 61 includes acceleration data 62. The acceleration data 62 is data representing acceleration (acceleration vector) detected by the acceleration sensor 37. In the present embodiment, the acceleration data 62 is data representing a three-dimensional acceleration vector Vec=(VX, VY, VZ) having the three components of acceleration along the three respective axes (X, Y and Z-axes) shown in FIG. 3. Further, in addition to the acceleration data 62, the operation data 61 also includes operation button data representing the input state of each of the operation buttons 32a to 32i, and marker coordinates data representing the marker coordinates mentioned above.

The game processing data 63 is data used in the game processing (FIG. 13) to be described later. The game processing data 63 includes corrected acceleration data 64, tilt angle data 65, first boundary angle data 66, second boundary angle data 67, first reference angle data 68, second reference angle data 69, and output value data 70. In addition to the data shown in FIG. 12, the game processing data 63 includes various data used in the game processing (a magnitude W of an acceleration vector, a combined ratio K, a projection vector Pro, and lengths B1 and B2 of circular arcs, all of which will be described later).

The corrected acceleration data 64 is data representing an acceleration vector Acc=(AX, AY, AZ), on which a predetermined correction process is performed on the acceleration vector represented by the acceleration data 62 (hereinafter referred to as a "corrected acceleration vector"). Although the details will be described later, in the predetermined correction process, a component of gravitational acceleration is extracted from the acceleration represented by the acceleration data 62 so as to obtain corrected acceleration accurately representing a tilt angle of the controller 5.

The tilt angle data 65 represents a tilt angle of the controller 5. Specifically, the tilt angle data 65 represents the tilt angle vector Nrm=(Nx, Ny) mentioned above. The tilt angle data 65 is calculated based on the corrected acceleration data 64.

Each of the first and second boundary angle data is data representing a boundary angle mentioned above. Specifically, the first boundary angle data 66 represents the first boundary angle vector MaxL=(MaxLx, MaxLy), and the second boundary angle data 67 represents the second boundary angle vector MaxR=(MaxRx, MaxRy).

Each of the first and second reference angle data 68 and 69 is data representing a reference angle mentioned above. Specifically, the first reference angle data 68 represents the first reference vector (=(−0.5, 0.866)), and the second reference angle data 69 represents the second reference vector (=(0.5, 0.866)). The first and second reference vectors are previously set in the game program 60, and the first and second reference angle data 68 and 69 are stored in the main memory at a time of starting the game processing.

Note that in the present embodiment, each of the tilt angle, the boundary angle and the reference angle is represented by a vector. In another embodiment, each of the tilt angle, the boundary angle and the reference angle may be represented by a numerical value simply indicating an angle such as "30°", for example.

The output value data 70 represents an output value calculated based on the tilt angle and the boundary angle. As described above, the output value is calculated as a ratio of the tilt angle to the boundary angle. Furthermore, in the present embodiment, a state where the controller 5 is tilted in one turning direction is distinguished from a state where the controller 5 is tilted in the other turning direction. Therefore, an output value Steer can be within a range of $-1 \leq \text{Steer} \leq 1$. Note that in another embodiment, only if an output value is calculated based on the tilt angle and the boundary angle and also calculated such that an allowable range thereof is limited, any calculation method may be used. For example, an output value does not need to be within a range from "−1" to "1". Instead, the output value may be a value equal to a predetermined multiple of the aforementioned ratio, for example.

Figure 13:
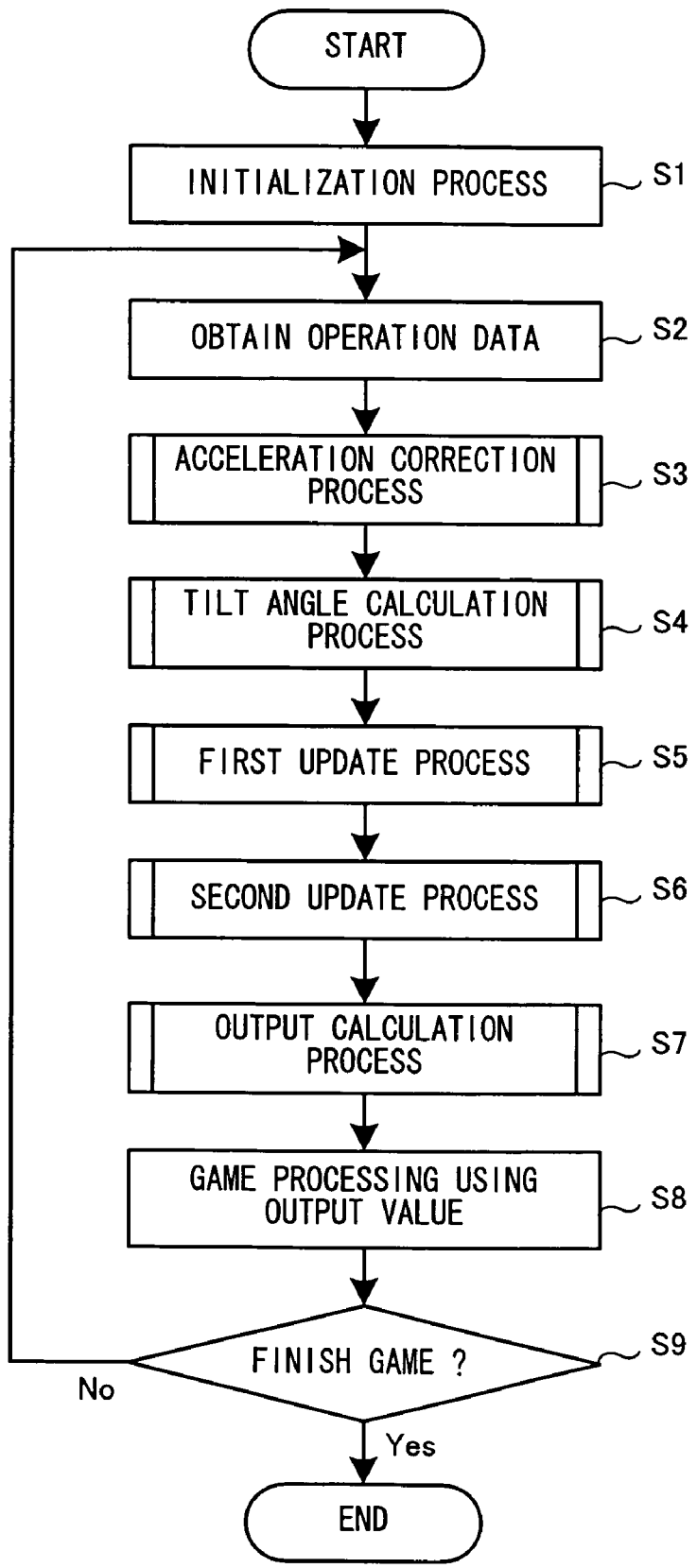
FIG. 13 is a main flowchart illustrating a flow of processes executed by the game apparatus 3.

Next, with reference to FIGS. 13 to 20, the game processing executed by the game apparatus 3 will be described in detail. FIG. 13 is a main flowchart illustrating a flow of the game processing executed by the game apparatus 3. When the game apparatus 3 is powered on, the CPU 10 of the game apparatus 3 executes a boot program stored in a boot ROM not shown so as to initialize each unit such as the main memory. The game program stored on the optical disc 4 is loaded to the main memory and the CPU 10 starts to execute the game program. The flowchart of FIG. 13 shows the game processing executed after these processes are completed.

Firstly, in step S1, an initialization process of the game is executed. Specifically, in the initialization process, values of the corrected acceleration data 64, the tilt angle data 65, the first boundary angle data 66, the second boundary angle data 67 and the output value data 70 are initialized. Specifically, the corrected acceleration data 64 is set such that the corrected acceleration vector Acc=(1, 0, 0) is satisfied, the tilt angle data 65 is set such that the tilt angle vector Nrm=(0, 1) is satisfied, the first boundary angle data 66 is set such that the first boundary angle vector MaxL=(−0.5, 0.886) is satisfied, the second boundary angle data 67 is set such that the second boundary angle vector MaxR=(0.5, 0.886) is satisfied, and the output value data 70 is set such that the output value Steer=0 is satisfied. Furthermore, in the initialization process, the first and second reference angle data 68 and 69 are stored in the main memory. Note that in the initialization process, other than initializing the aforementioned data, a game space is established, and a process of disposing a player object and other objects at initial positions in the game space and the like are executed. After step S1, a process loop from steps S2 to S9 is repeatedly executed while the game is executed. Note that the process loop is executed at a cycle of one frame period (1/60 sec, for example).

In step S2, the CPU 10 obtains the operation data. Specifically, the operation data transmitted from the controller 5 is received via the wireless controller module 19, and the acceleration data included in the received operation data is stored in the main memory. Thus, the CPU 10 reads the acceleration data 62 from the main memory. In the process loop from steps S2 to S9, step S2 is repeatedly executed, thereby repeatedly obtaining a value (acceleration vector Vec) changed in accordance with the motion of the controller 5. After step S2, a process of step S3 is executed.

In step S3, an acceleration correction process is executed. In the acceleration correction process, the acceleration vector Vec obtained in step S2 is corrected so as to more accurately calculate a tilt of the controller 5. Hereinafter, with reference to FIG. 14, the acceleration correction process will be described in detail.

Figure 14:
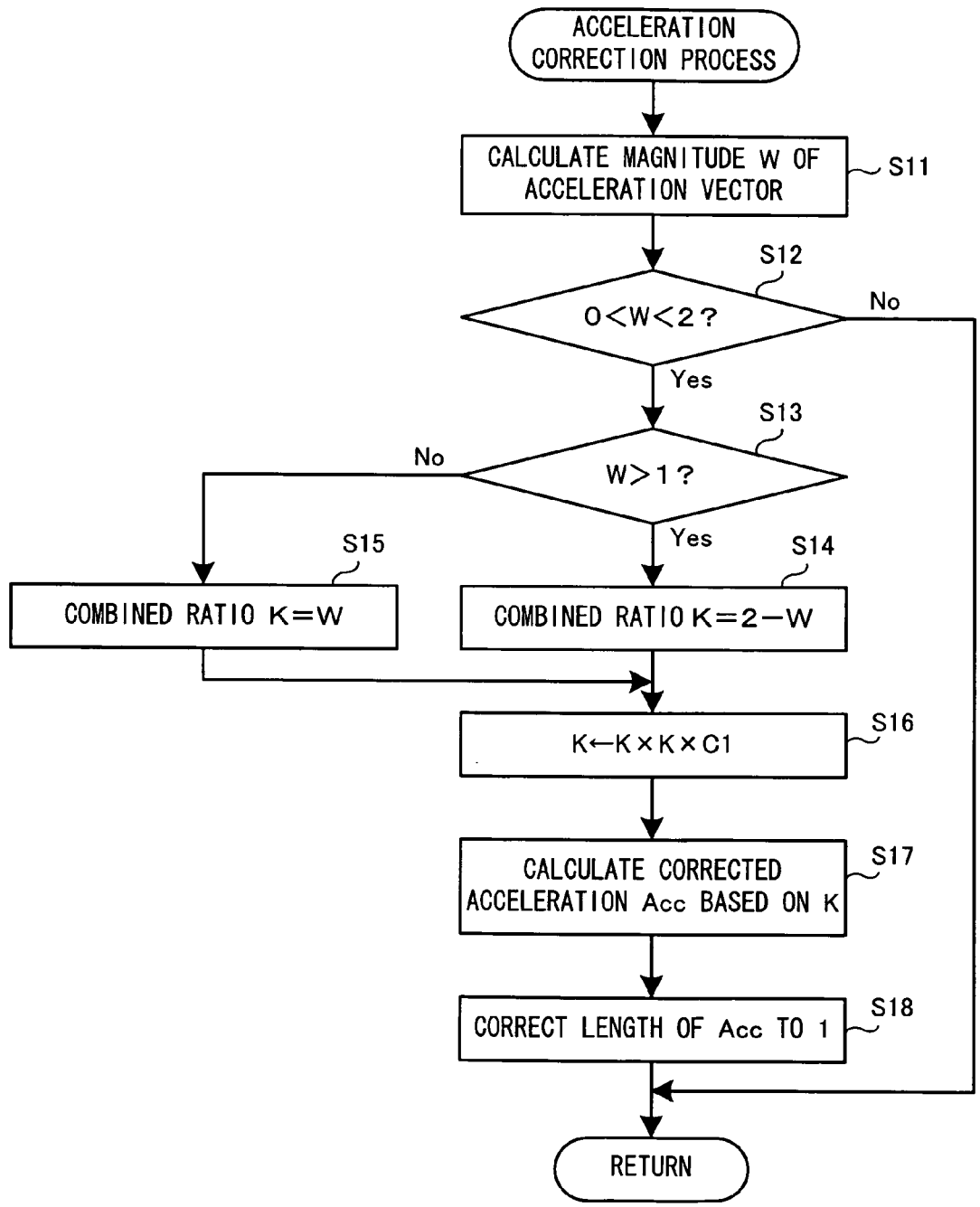
FIG. 14 is a flowchart illustrating a flow of an acceleration correction process (step S3) shown in FIG. 13.

FIG. 14 is a flowchart illustrating a flow of the acceleration correction process (step S3) shown in FIG. 13. In the acceleration correction process, firstly in step S11, the CPU 10 calculates a magnitude W of the acceleration vector Vec obtained in step S2. Specifically, the CPU 10 reads the acceleration data 62 stored in the main memory, and calculates the magnitude of the acceleration vector Vec represented by the acceleration data 62 so as to be stored in the main memory. After step S11, a process of step S12 is executed.

In step S12, the CPU 10 determines whether or not the magnitude W of the acceleration vector stored in the main memory satisfies "0<W<2". Note that the present embodiment assumes that a magnitude of the acceleration vector Vec detected by the acceleration sensor 37 when the controller 5 is in a static state is "1". When the controller 5 is in a dynamic state, the acceleration sensor 37 detects, in addition to the gravitational acceleration, acceleration caused by the inertia generated by the controller 5 being moved. Therefore, when the controller 5 is being moved, the magnitude of the acceleration vector Vec may be apart from "1". Particularly, when the controller 5 is being moved intensely, the magnitude of the acceleration vector Vec may be greatly apart from "1". In other words, the process of step S12 is executed to determine whether or not the controller 5 is being moved intensely. Note that in the present embodiment, a range within which the controller 5 is determined not to be moved intensely is "0<W<2". However, the range may be determined by other values. When it is determined "Yes" in step S12, a process of step S13 is executed. On the other hand, when it is determined "No" in step S12, processes from steps S13 to S18 are skipped and the CPU 10 finishes the acceleration correction process.

As described above, in the present embodiment, when the controller 5 is being moved intensely (when it is determined "No" in step S12), a process of updating the corrected acceleration (step S17 to be described later) is not executed. This is because when the controller 5 is being moved intensely, it is considered that a value of the acceleration vector Vec is not reliable, and thus a tilt angle of the controller 5 cannot be accurately detected since the acceleration vector Vec detected by the acceleration sensor 37 contains a large amount of component other than the gravitational acceleration (i.e., component of the acceleration caused by the inertia generated by the controller 5 being moved). In this case, in a process of step S4 to be described later, an acceleration vector having a reliable value which has been previously calculated is used. Thus, the CPU 10 can prevent an inaccurate value from being calculated as the corrected acceleration, thereby making it possible to more accurately calculate the tilt of the controller 5.

In steps S13 to S16, the CPU 10 calculates the combined ratio K based on the magnitude W of the acceleration vector. In the present embodiment, the corrected acceleration vector Acc is calculated by combining a most recently calculated corrected acceleration vector Acc' and the acceleration vector Vec. The combined ratio K is a variable indicating a ratio of combining the acceleration vector Vec and the most recently calculated corrected acceleration vector Acc'. Hereinafter, a calculation method of the combined ratio K will be described in detail.

In step S13, the CPU 10 determines whether or not the magnitude W of the acceleration vector stored in the main memory satisfies "W>1". When it is determined "Yes" in step S13, a process of step S14 is executed. In step S14, the CPU 10 calculates the combined ratio K by subtracting the magnitude W of the acceleration vector from "2". On the other hand, when it is determined "No" in step S13, a process of step S15 is executed. In step S15, the CPU 10 sets the magnitude W of the acceleration vector as the combined ratio K. By executing steps S13 to S15 mentioned above, the combined ratio K is calculated as a value indicating how close the magnitude W of the acceleration vector is to a magnitude of the gravitational acceleration (i.e., "1"). After step S14 or step S15, a process of step S16 is executed.

In step S16, the CPU 10 corrects the combined ratio K calculated in step S14 or step S15 such that the closer a value of the combined ratio K is to "1", the more weight is assigned thereto. The corrected combined ratio K is calculated in accordance with the following formula (1).

$$K = K' \times K' \times C1 \tag{1}$$

In the above formula (1), a variable K' is a combined ratio before being corrected, and a constant C1 is previously defined within a range of $0 < C1 \leq 1$ (C1=0.2, for example). By executing the process of step S16, the corrected combined ratio K is corrected so as to be greater as the combined ratio K' before being corrected is closer to "1". After step S16, a process of step S17 is executed.

In step S17, the CPU 10 calculates the corrected acceleration vector Acc based on the combined ratio K. The corrected acceleration vector Acc is calculated in accordance with the following formula (2) by using the acceleration vector Vec obtained in step S2, the most recently calculated corrected acceleration vector Acc', and the combined ratio K calculated in step S16.

$$Acc = (Vec - Acc') \times K + Acc' \tag{2}$$

Note that the acceleration vector Vec is obtained by reading the acceleration data 62 stored in the main memory, and the most recently calculated corrected acceleration vector Acc' is obtained by reading the corrected acceleration data 64 stored in the main memory. According to the above formula (2), a newly calculated corrected acceleration vector Acc is a vector extending from a start point, which is an origin of the XYZ coordinate system, to an end point, which is a point internally dividing a line segment connecting an end point of the most recently calculated corrected acceleration vector ACC' to an endpoint of the acceleration vector Vec obtained in step S2 at a ratio of K:(1−K). In the above formula (2), a most recently calculated corrected acceleration vector is corrected so as to be close to the acceleration vector Vec obtained in step S2. Therefore, according to the above formula (2), the corrected acceleration vector Acc is a vector changed in accordance with the acceleration vector Vec obtained in step S2. In other words, a signal indicating a change in the corrected acceleration vector Acc is a signal obtained by smoothing a signal indicating a change in the acceleration vector Vec obtained at predetermined time intervals. Note that in the present embodiment, a value of the combined ratio K becomes greater as the magnitude W of the obtained acceleration vector Vec is closer to "1". Thus, the closer a state of the controller 5 is to a static state, the more the obtained acceleration vector Vec reflects the corrected acceleration vector Acc. According to the above formula (2), the corrected acceleration vector Acc remains constant even when the acceleration vector Vec subtly changes, thereby making it possible to prevent an output value from being changed due to hand shake movement. In step S17, the corrected acceleration data 64 stored in the main memory is updated to data representing the corrected acceleration vector Acc which is newly calculated by the above formula (2). After step S17, a process of step S18 is executed.

In step S18, the CPU 10 normalizes the corrected acceleration vector Acc such that a magnitude of the corrected acceleration vector Acc calculated in step S17 becomes "1". The corrected acceleration data 64 stored in the memory is updated to data representing the corrected acceleration vector Acc corrected in step S18. After step S18, the CPU 10 finishes the acceleration correction process.

Referring back to FIG. 13, in step S4 subsequent to step S3, the CPU 10 executes a tilt angle calculation process. In the tilt angle calculation process, the tilt angle Nrm of the controller 5 is calculated by using the corrected acceleration vector Acc calculated in step S3. Hereinafter, with reference to FIG. 15, the tilt angle calculation process will be described in detail.

Figure 15:
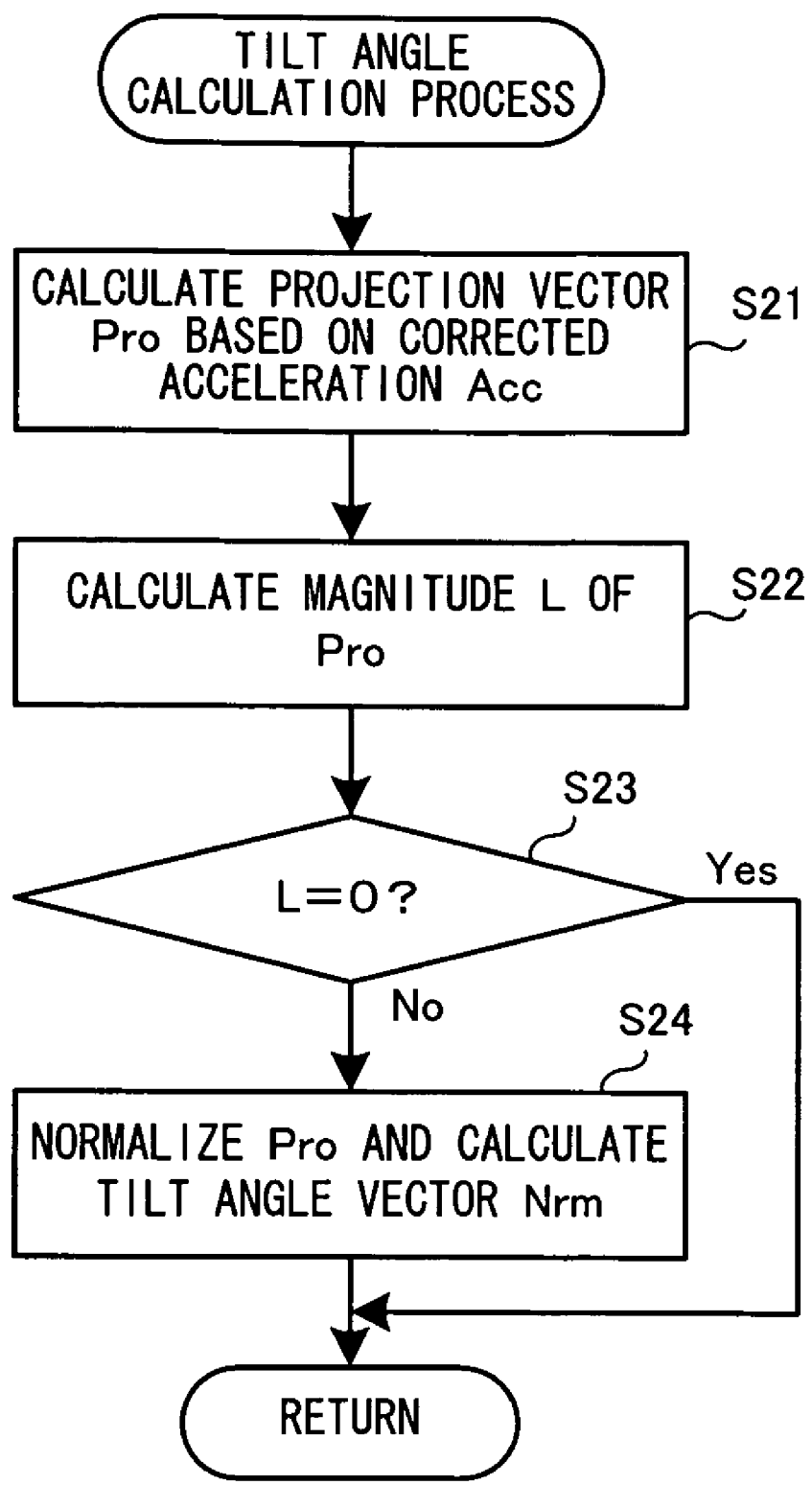
FIG. 15 is a flowchart illustrating a flow of a tilt angle calculation process (step S4) shown in FIG. 13.

FIG. 15 is a flowchart illustrating a flow of the tilt angle calculation process (step S4) shown in FIG. 13. In the tilt angle calculation process, firstly in step S21, the CPU 10 calculates a projection vector based on the corrected acceleration vector Acc calculated in step S3. Hereinafter, with reference to FIG. 16, a calculation method of the projection vector will be described.

Figure 16:
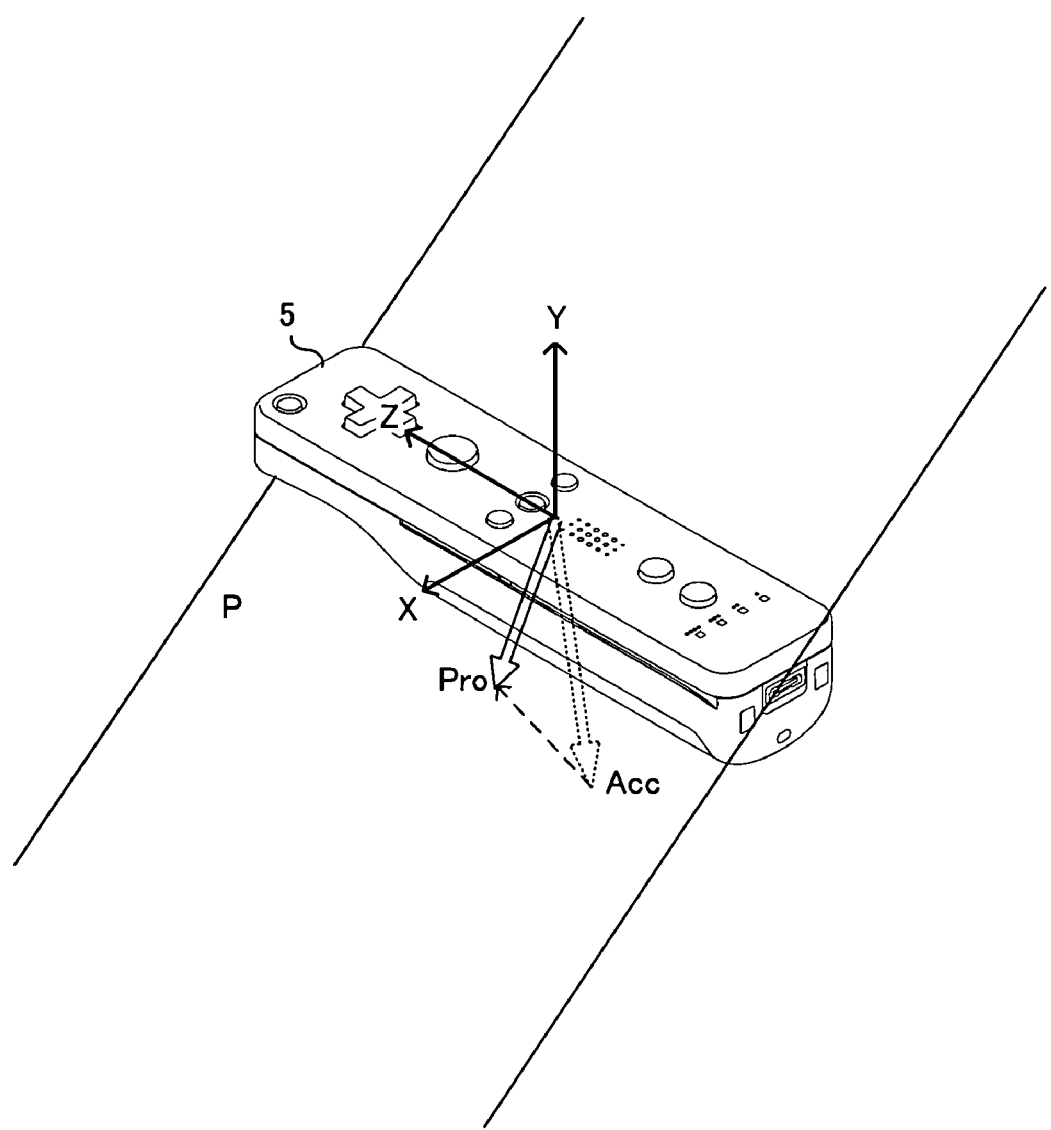
FIG. 16 is a diagram describing a calculation method of a projection vector.

FIG. 16 is a diagram describing the calculation method of the projection vector. In FIG. 16, a plane P in the XYZ coordinate system contains the Z-axis and forms 45° with respect to the X-axis and the Y-axis. Specifically, the plane P is represented as "X+Y=0". As shown in FIG. 16, the projection vector Pro is a vector obtained by projecting the corrected acceleration vector Acc onto the plane P. Specifically, the projection vector Pro=(Px, Py) is calculated in accordance with the following formula (3) by using the corrected acceleration vector Acc=(AX, AY, AZ).

$$Px = -AZ$$

$$Py = 0.707 \times AX - 0.707 \times AY \quad (3)$$

As is clear from the above formula (3), the projection vector Pro is represented in the xy coordinate system for representing the tilt angle vector Nrm. Furthermore, in the xy coordinate system, the x-axis positive direction is the X-axis negative direction on the plane P and a y-axis is an axis along which the X-axis or the Y-axis is projected onto the plane P. In step S21, the projection vector Pro is calculated in such a manner as described above. After step S21, a process of step S22 is executed.

In step S22, the CPU 10 calculates a magnitude L of the projection vector Pro calculated in step S21. Then, in step S23, the CPU 10 determines whether or not the magnitude L of the projection vector Pro is "0". When it is determined "Yes" in step S23, a process of step S24 is executed. On the other hand, when it is determined "No" in step S23, the process of step S24 is skipped, and the CPU 10 finishes the tilt angle calculation process.

In step S24, the CPU 10 calculates the tilt angle vector Nrm by normalizing the projection vector Pro calculated in step S21 (by causing the magnitude thereof to become "1"). The tilt angle data 65 stored in the memory is updated to data representing the tilt angle vector Nrm which is newly calculated in step S24. After step S24, the CPU 10 finishes the tilt angle calculation process.

Through the aforementioned processes from steps S21 to S24, the tilt angle vector Nrm representing the tilt angle of the controller 5 is calculated. As described above, the present embodiment assumes that the player performs an operation holding the front end of the controller 5 in a left hand and the rear end of the controller 5 in a right hand, and also holding the controller 5 in such a manner that thumbs of the player can be in contact with the button surface. In such a case, the controller 5 is held in a position in which the plane P is parallel to a perpendicular direction or in a position in proximity thereto. In the present embodiment, assuming that the controller 5 is held at a position in which the plane P is parallel to the perpendicular direction, the projection vector Pro is calculated in step S21 and the tilt angle vector Nrm is calculated based on the projection vector Pro having been obtained. Thus, the tilt angle of the controller 5 can be represented by a two-dimensional vector, thereby making it possible to simplify processes thereafter.

When it is determined "No" in step S23, the process of step S24 is not executed. In this case, the tilt angle data 65 calculated in an immediately preceding process loop from step S2 to step S9 still remains in the main memory. Therefore, in the processes from step S5 onward to be executed in a current process loop, the tilt angle vector calculated in the immediately preceding process loop is used. This is because when it is assumed that the controller 5 is held in such a manner as described above, it is considered that a value of the corrected acceleration vector Acc is not accurate when it is determined "No" in step S23.

Referring back to FIG. 13, in step S5 subsequent to step S4, the CPU 10 executes a first update process. In the first update process, when a tilt angle calculated in step S4 is greater than a current boundary angle, the boundary angle data is updated such that the tilt angle becomes a new boundary angle. Hereinafter, with reference to FIG. 17, the first update process will be described in detail.

Figure 17:
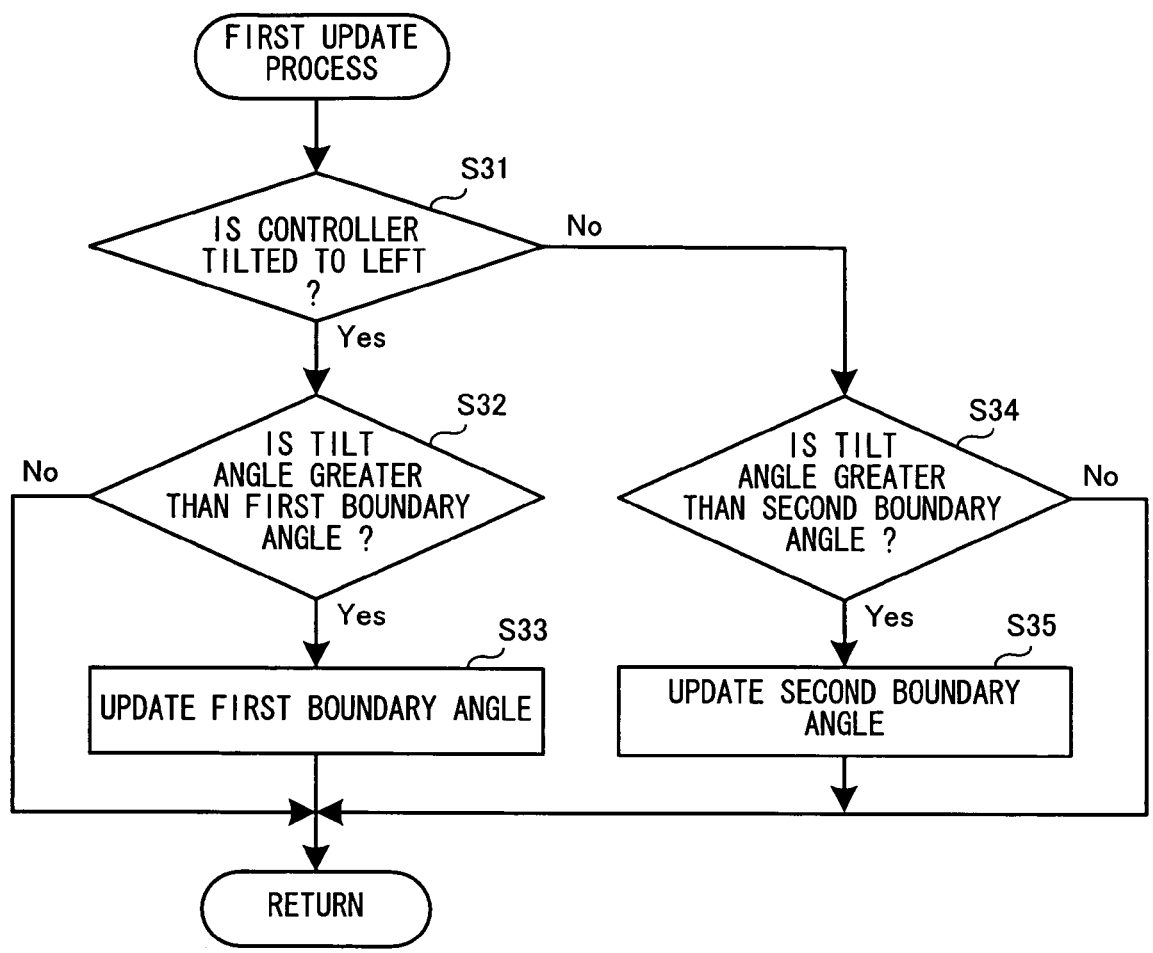
FIG. 17 is a flowchart illustrating a flow of a first update process (step S5) shown in FIG. 13.

FIG. 17 is a flowchart illustrating a flow of the first update process (step S5) shown in FIG. 13. In the first update process, firstly in step S31, the CPU 10 determines whether or not the controller 5 is tilted to the left. This determination is made by reading the x component of the tilt angle vector Nrm represented by the tilt angle data 65 stored in the main memory. Specifically, when the x component of the tilt angle vector Nrm is a positive value, the controller 5 is tilted to the right, whereas when the x component of the tilt angle vector Nrm is a negative value, the controller 5 is tilted to the left. When it is determined "Yes" in step S31, a process of step S32 is executed. On the other hand, when it is determined "No" in step S31, a process of step S34 to be described later is executed.

In step S32, the CPU 10 determines whether or not a tilt angle is greater than the first boundary angle. This determination is made by comparing a y component of the tilt angle vector Nrm represented by the tilt angle data 65 stored in the main memory with a y component of the first boundary angle vector MaxL represented by the first boundary angle data 66 stored in the main memory. Specifically, when the y component of the tilt angle vector Nrm is smaller than the y component of the first boundary angle vector MaxL, it is determined that the tilt angle is greater than the first boundary angle, whereas when the y component of the tilt angle vector Nrm is equal to or greater than the y component of the first boundary angle vector MaxL, it is determined that the tilt angle is not greater than the first boundary angle. When it is determined "Yes" in step S32, a process of step S33 is executed. On the other hand, when it is determined "No" in step S32, the CPU 10 finishes the first update process.

In step S33, the CPU 10 updates the first boundary angle so as to be equal to the tilt angle. Specifically, a content of the first boundary angle data 66 is updated to a value equal to the tilt angle vector Nrm represented by the tilt angle data 65. Note that since the process of step S33 is not executed when it is determined "No" in step S32 mentioned above, the first boundary angle is not updated. After step S33, the CPU 10 finishes the first update process.

As described above, in steps S32 and S33, when the tilt angle is greater than the first boundary angle, the first boundary angle is updated. Similarly, in steps S34 and S35, when the tilt angle is greater than the second boundary angle, the second boundary angle is updated.

In step S34, the CPU 10 determines whether or not the tilt angle is greater than the second boundary angle. This determination is made by comparing the y component of the tilt angle vector Nrm represented by the tilt angle data 65 stored in the main memory with a y component of the second boundary angle vector MaxR represented by the second boundary angle data 67 stored in the main memory. Specifically, when the y component of the tilt angle vector Nrm is smaller than the y component of the second boundary angle vector MaxR, it is determined that the tilt angle is greater than the second boundary angle, whereas when the y component of the tilt angle vector Nrm is equal to or greater than the y component of the second boundary angle vector MaxR, it is determined that the tilt angle is not greater than the second boundary angle. When it is determined "Yes" in step S34, a process of step S35 is executed. On the other hand, when it is determined "No" in step S34, the CPU 10 finishes the first update process.

In step S35, the CPU 10 updates the second boundary angle so as to be equal to the tilt angle. Specifically, a content of the second boundary angle data 67 is updated to a value equal to the tilt angle vector Nrm represented by the tilt angle data 65. Note that since the process of step S35 is not executed when it is determined "No" in step S34 mentioned above, the second boundary angle is not updated. After step S35, the CPU 10 finishes the first update process.

Referring back to FIG. 13, in step S5 subsequent to step S6, the CPU 10 executes a second update process. In the second update process, when the tilt angle is less than a current boundary angle, the boundary angle data is updated such that the current boundary angle returns to the reference angle. Hereinafter, with reference to FIGS. 18 and 19, the second update process will be described in detail.

Figure 18:
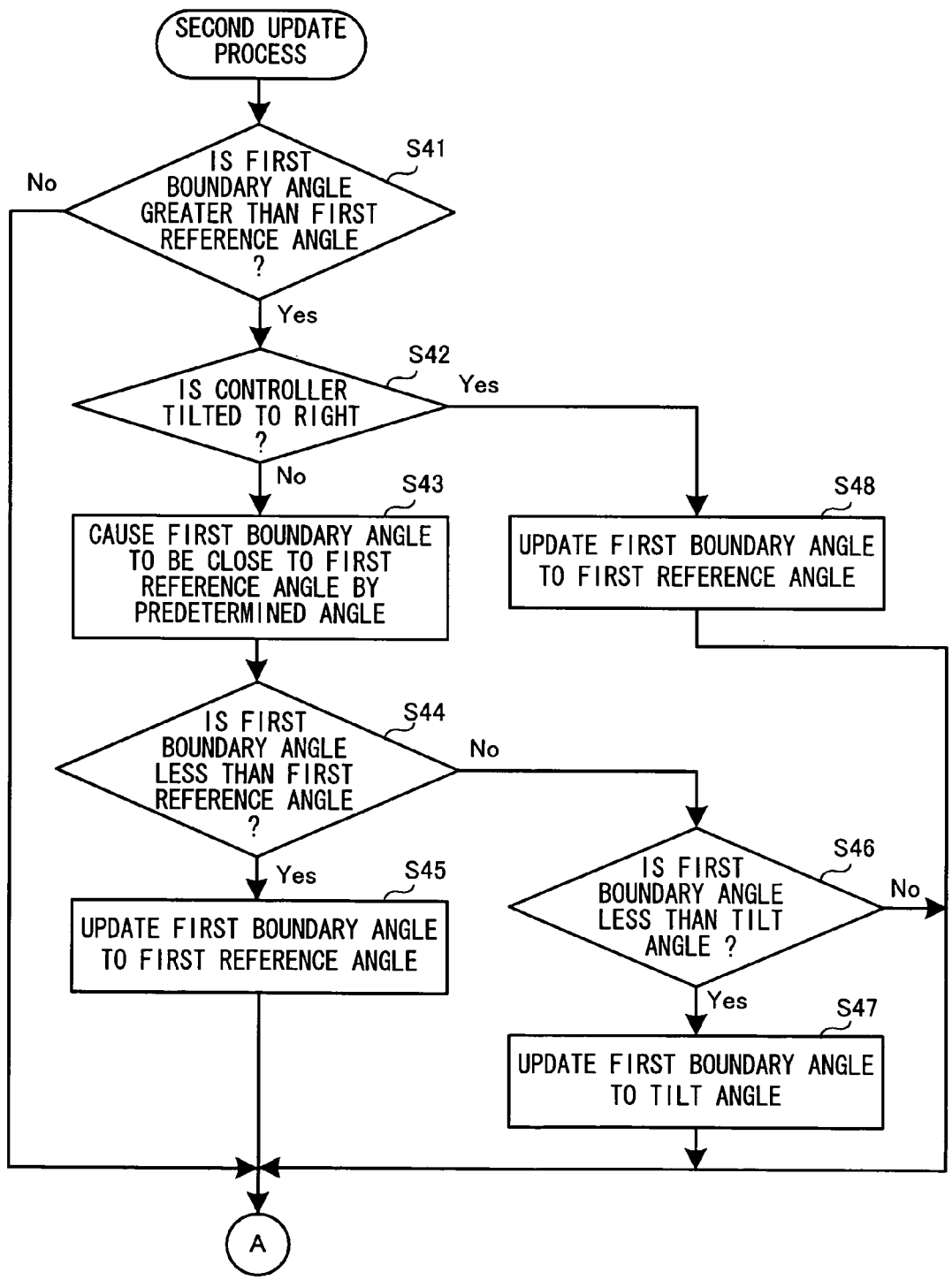
FIG. 18 is a flowchart illustrating a flow of a second update process (step S6) shown in FIG. 13.
Figure 19:
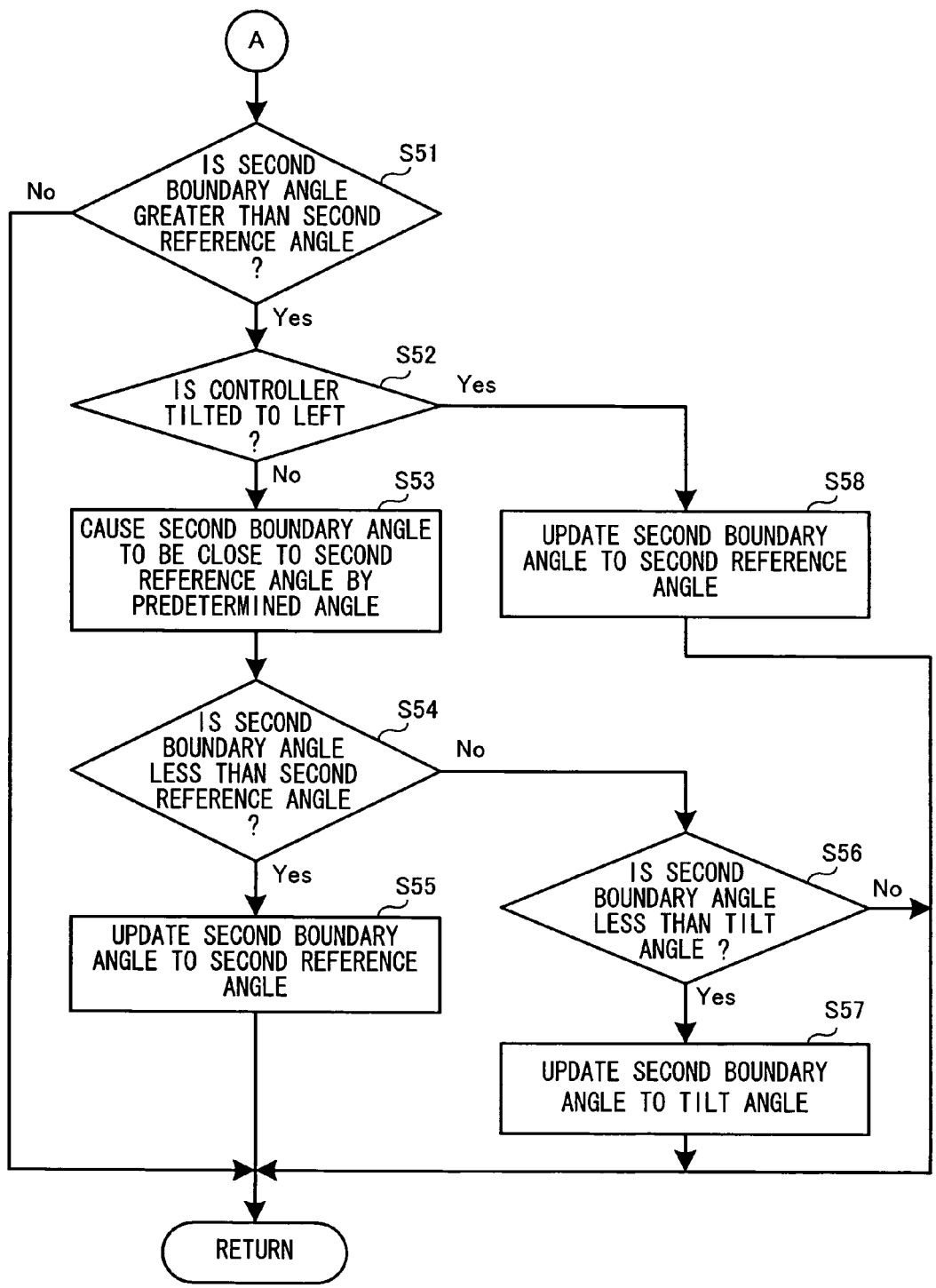
FIG. 19 is a flowchart illustrating the flow of the second update process (step S6) shown in FIG. 13.

FIGS. 18 and 19 are a flowchart illustrating a flow of the second update process (step S6) shown in FIG. 13. In the second update process, an update process is executed for the first boundary angle in steps S41 to S48 shown in FIG. 18, and the update process is executed for the second boundary angle in steps S51 to S58 shown in FIG. 19.

In step S41, the CPU 10 determines whether or not the first boundary angle is greater than the first reference angle. This determination is made by comparing the y component of the first boundary angle vector MaxL represented by the first boundary angle data 66 stored in the main memory with a y component of the first reference vector represented by the first reference angle data 68 stored in the main memory. Specifically, when the y component of the first boundary angle vector MaxL is smaller than the y component of the first reference vector, it is determined that the first boundary angle is greater than the first reference angle, whereas when the y component of the first boundary angle vector MaxL is equal to or greater than the y component of the first reference vector, it is determined that the first boundary angle is not greater than the first reference angle. When it is determined "Yes" in step S41, a process of step S42 is executed. On the other hand, when it is determined "No" in step S41, a process of step S51 is executed. In this case, the first boundary angle is not updated.

In step S42, the CPU 10 determines whether or not the controller 5 is tilted to the right. In step S42, whether the controller 5 is tilted to the right is determined, while in step S31 mentioned above, whether the controller 5 is tilted to the left is determined. Except for this point, the determination process of step S42 is the same as that of step S31. Therefore, similarly to step S31, the determination process of step S42 is executed by reading the x component of the tilt angle vector Nrm represented by the tilt angle data 65 stored in the main memory. When it is determined "No" in step S42, a process of step S43 is executed. On the other hand, when it is determined "Yes" in step S42, a process of step S48 to be described later is executed.

In step S43, the CPU 10 causes the first boundary angle to be close to the first reference angle by a preset predetermined angle (i.e., subtracts a predetermined angle from the first boundary angle). Specifically, the CPU 10 firstly rotates a first boundary angle vector MaxL' before being updated in a direction which causes the first boundary angle vector MaxL' to be close to the first reference angle. The rotated vector (Mx, My) is calculated in accordance with the following formula (4) by using the first boundary angle vector MaxL'=(MaxLx', MaxLy') before being updated.

$$Mx=\text{Max}Lx'+\text{Max}Ly'\times C2$$

$$My=\text{Max}Ly'-\text{Max}Lx'\times C2 \quad (4)$$

In the above formula (4), a constant C2 is previously defined within a range of "C2>0" (C2=0.0014, for example). Further, the first boundary angle vector MaxL' before being updated is obtained by reading the first boundary angle data 66 stored in the main memory. In the above formula (4), a vector (MaxLy×C2, −MaxLx×C2) perpendicular to the first boundary angle vector MaxL' is added to the first boundary angle vector MaxL', thereby rotating the first boundary angle vector MaxL'. After calculating the rotated vector in the above formula (4), the CPU 10 normalizes the rotated vector, thereby obtaining the updated first boundary angle vector MaxL. The first boundary angle data 66 stored in the main memory is updated to data representing the first boundary angle vector MaxL obtained in such a manner as described above. After step S43, a process of step S44 is executed.

In step S44, the CPU 10 determines whether or not the first boundary angle is less than the first reference angle. In step S44, whether the first boundary angle is less than the first reference angle is determined, while in step S41 mentioned above, whether the first boundary angle is greater than the first reference angle is determined. Except for this point, the determination process of step S44 is the same as that of step S41. Therefore, similarly to step S41, the determination process of step S44 is executed by comparing the y component of the first boundary angle vector MaxL represented by the first boundary angle data 66 with the y component of the first reference vector represented by the first reference angle data 68. When it is determined "Yes" in step S44, a process of step S45 is executed. On the other hand, when it is determined "No" in step S44, a process of step S46 is executed.

In step S45, the CPU 10 updates the first boundary angle so as to be equal to the first reference angle. Specifically, the content of the first boundary angle data 66 is updated to a value (−0.5, 0.886) equal to the first reference angle vector represented by the first reference angle data 68. After step S45, a process of step S51 to be described later is executed.

As shown in steps S43 to S45, when the first boundary angle is greater than the first reference angle, the CPU 10 decreases the first boundary angle by a preset predetermined angle (step S43). In the present embodiment, an output value is calculated based on a boundary angle and a tilt angle. Therefore, when the boundary angle changes, the output value accordingly changes even when the tilt angle remains unchanged. That is, when the first boundary angle changes in step S43, the output value may unexpectedly change even if the player does not operate the controller 5. However, the constant C2 is set such that a change amount of the first boundary angle is not to be too large, thereby making it possible to allow the player not to be aware of a change in the output value.

Furthermore, in step S43, when the first boundary angle is excessively decreased (i.e., when the first boundary angle is less than the first reference angle ("Yes" in step S44)), the CPU 10 sets the first boundary angle so as to be equal to the first reference angle (step S45). Therefore, the processes from steps S43 to S45 are repeatedly executed, thereby making it possible to decrease the first boundary angle within a range in which the first boundary angle does not become less than the first reference angle. As a result, the first boundary angle can be returned to the first reference angle.

On the other hand, in step S46 ("No" in step S44), the CPU 10 determines whether or not the first boundary angle is less than the tilt angle. The determination process of step S46 is executed by comparing the y component of the first boundary angle vector MaxL represented by the first boundary angle data 66 with the y component of the tilt angle vector Nrm represented by the tilt angle data 65. When it is determined "Yes" in step S46, a process of step S47 is executed. On the other hand, when it is determined "No" in step S46, the process of step S47 is skipped and a process of step S51 to be described later is executed.

In step S47, the CPU 10 updates the first boundary angle so as to be equal to the tilt angle. The process of step S47 is the same as that of step S33 mentioned above. After step S47, the process of step S51 to be described later is executed.

According to steps S46 and S47 mentioned above, when the first boundary angle is excessively decreased (i.e., when the first boundary angle is less than the tilt angle ("Yes" in step S46)) as a result of decreasing the first boundary angle by the preset predetermined angle, the CPU 10 sets the first boundary angle so as to be equal to the tilt angle. Therefore, according to steps S46 and S47, the first boundary angle can be decreased within a range in which the first boundary angle does not become less than the tilt angle, when returning the first boundary angle to the first reference angle through the processes from steps S43 to S45.

In step S48 ("Yes" in step S42), the CPU 10 updates the first boundary angle so as to be equal to the first reference angle. The process of step S48 is the same as that of step S45 mentioned above. After step S48, the process of step S51 to be described later is executed.

As described above, in the present embodiment, when the controller 5 is tilted to the left ("No" in step S42), the first boundary angle is gradually returned to the first reference angle (steps S43 to S47), whereas when the controller 5 is tilted to the right ("Yes" in step S42), the first boundary angle is returned to the first reference angle all at once (step S48). This is because when the controller 5 is tilted to the right, the first boundary angle does not affect an output value, and thus no problem would occur even if the first boundary angle is changed to a large extent. Furthermore, it is more preferable that the process would be simpler when the first boundary angle is rather quickly returned to the first reference angle.

In steps S51 to S58, an update process is executed for the second boundary angle. Processes from steps S51 to S58 are conceptually the same as those from steps S41 to S48.

In step S51, the CPU 10 determines whether or not the second boundary angle is greater than the second reference angle. This determination is made by comparing the y component of the second boundary angle vector MaxR represented by the second boundary angle data 67 stored in the main memory with a y component of the second reference vector represented by the second reference angle data 69 stored in the main memory. When it is determined "Yes" in step S51, a process of step S52 is executed. On the other hand, when it is determined "No" in step S51, the CPU 10 finishes the second update process. In this case, the second boundary angle is not updated.

In step S52, the CPU 10 determines whether or not the controller 5 is tilted to the left. The determination process of step S52 is the same as that of step S31. When it is determined "No" in step S52, a process of step S53 is executed. On the other hand, when it is determined "Yes" in step S52, a process of step S58 to be described later is executed.

In step S53, the CPU 10 causes the second boundary angle to be close to the second reference angle by a preset predetermined angle (i.e., subtracts a predetermined angle from the second boundary angle). A method of rotating the second boundary angle vector MaxR' by the predetermined angle in step S53 is the same as that described in step S43. After step S53, a process of step S54 is executed.

In step S54, the CPU 10 determines whether or not the second boundary angle is less than the second reference angle. In step S54, whether the second boundary angle is less than the second reference angle is determined, while in step S51 mentioned above, whether the second boundary angle is greater than the second reference angle is determined. Except for this point, the determination process of step S54 is the same as that of step S51. Therefore, similarly to step S51, the determination process of step S54 is executed by comparing the y component of the first boundary angle vector MaxR represented by the second boundary angle data 67 with the y component of the second reference vector represented by the second reference angle data 69. When it is determined "Yes" in step S54, a process of step S55 is executed. On the other hand, when it is determined "No" in step S54, a process of step S56 is executed.

In step S55, the CPU 10 updates the second boundary angle so as to be equal to the second reference angle. Specifically, the content of the second boundary angle data 67 is updated to a value (0.5, 0.886) equal to the second reference angle vector represented by the second reference angle data 69. After step S55, the CPU 10 finishes the second update process.

Similarly to steps S43 to S45 mentioned above, the processes from steps S53 to S55 are repeatedly executed, thereby making it possible to decrease the boundary angle within a range in which the boundary angle does not become less than the reference angle. As a result, the boundary angle can be returned to the reference angle.

On the other hand, in step S56 ("No" in step S54), the CPU 10 determines whether or not the second boundary angle is less than the tilt angle. The determination process of step S56 is executed by comparing the y component of the second boundary angle vector MaxR represented by the second boundary angle data 67 with the y component of the tilt angle vector Nrm represented by the tilt angle data 65. When it is determined "Yes" in step S56, a process of step S57 is executed. On the other hand, when it is determined "No" in step S56, the process of step S57 is skipped and the CPU 10 finishes the second update process.

In step S57, the CPU 10 updates the second boundary angle so as to be equal to the tilt angle. The process of step S57 is the same as that of step S35 mentioned above. After step S57, the CPU 10 finishes the second update process.

Similarly to steps S46 and S47 mentioned above, according to steps S56 and S57, the second boundary angle can be decreased within a range in which the second boundary angle does not become less than the tilt angle, when returning the second boundary angle to the second reference angle through the processes from steps S53 to S55.

In step S58 ("Yes" in step S52), the CPU 10 updates the second boundary angle so as to be equal to the second reference angle. The process of step S58 is the same as that of step S55 mentioned above. Similarly to step S48 mentioned above, according to step S58, the boundary angle can be quickly returned to the reference angle, and therefore the process also becomes simpler. After step S58, the CPU 10 finishes the second update process.

Referring back to FIG. 13, in step S7 subsequent to step S6, the CPU 10 executes an output calculation process. In the output calculation process, an output value is calculated based on a ratio of the tilt angle to the boundary angle. Hereinafter, with reference to FIG. 20, the output calculation process will be described in detail.

Figure 20:
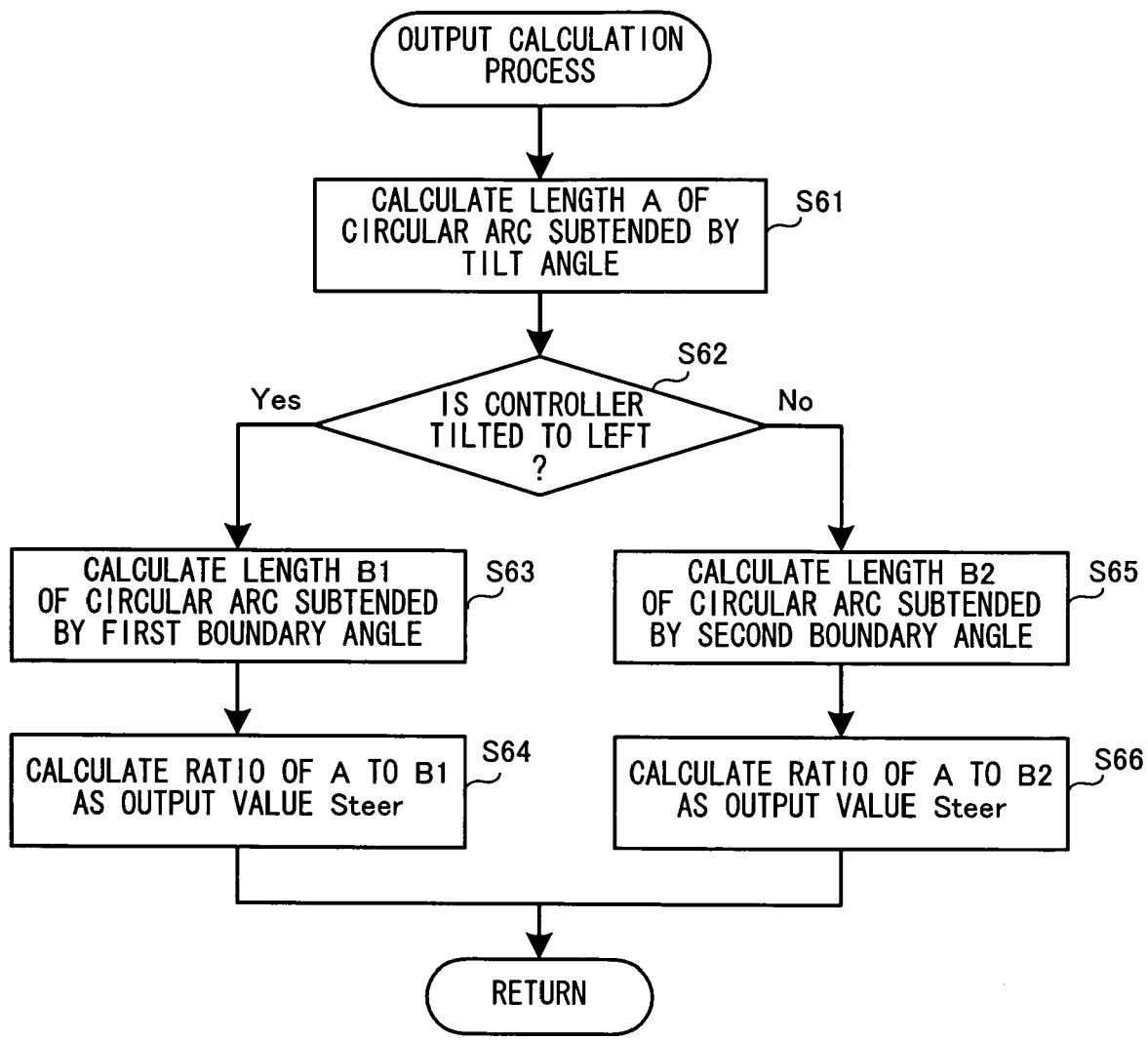
FIG. 20 is a flowchart illustrating a flow of an output calculation process (step S7) shown in FIG. 13.

FIG. 20 is a flowchart illustrating a flow of the output calculation process (step S7) shown in FIG. 13. In the output calculation process, firstly in step S61, the CPU 10 calculates a length A of a circular arc subtended by a tilt angle. Note that "a length of a circular arc subtended by a tilt angle" indicates a length of a circular arc having a radius of 1 and also having a central angle as an angle formed by the tilt angle vector Nrm and a vector (0, 1) extending in the y-axis positive direction (in the present embodiment, the central angle is equal to or less then 180°). The length A of the circular arc subtended by the tilt angle can be calculated by using the tilt angle vector Nrm represented by the tilt angle data 65. After step S61, a process of step S62 is executed.

In step S62, the CPU 10 determines whether or not the controller 5 is tilted to the left. The process of step S62 is the same as that of step S31 mentioned above. When it is determined "Yes" in step S62, a process of step S63 is executed. On the other hand, when it is determined "No" in step S62, a process of step S65 to be described above is executed.

In step S63, the CPU 10 calculates a length B1 of a circular arc subtended by the first boundary angle. Note that "a length of a circular arc subtended by the first boundary angle" indicates a length of a circular arc having a radius of 1 and also having a central angle as an angle formed by the first boundary angle vector MaxL and the vector (0, 1) extending in the y-axis positive direction (in the present embodiment, the central angle is equal to or less then 180°). The length B1 of the circular arc subtended by the first boundary angle can be calculated by using the first boundary angle MaxL represented by the first boundary angle data 66. After step S63, a process of step S64 is executed.

In step S64, the CPU 10 calculates, as the output value Steer, a ratio of the length A of the circular arc subtended by the tilt angle to the length B1 of the circular arc subtended by the first boundary angle. Specifically, the output value Steer is calculated in accordance with the following formula (5).

$$\text{Steer} = -A/B1 \quad (5)$$

In the above formula (5), a symbol "−" is assigned to the ratio in order to indicate the controller 5 tilted to the left. That is, in the present embodiment, a symbol "+" or "−" is assigned to the ratio in order to indicate the controller 5 tilted to either the right or left. The output value data 70 stored in the main memory is updated to data representing the output value Steer which is newly calculated by the above formula (5). After step S64, the CPU 10 finishes the output calculation process.

On the other hand, in step S65, the CPU 10 calculates a length B2 of a circular arc subtended by the second boundary angle. Note that "a length of a circular arc subtended by the second boundary angle" indicates a length of a circular arc having a radius of 1 and also having a central angle as an angle formed by the second boundary angle vector MaxR and the vector (0, 1) extending in the y-axis positive direction (in the present embodiment, the central angle is equal to or less then 180°). The length B2 of the circular arc subtended by the second boundary angle can be calculated by using the second boundary angle MaxR represented by the second boundary angle data 67. After step S65, a process of step S66 is executed.

In step S66, the CPU 10 calculates a ratio of the length A of the circular arc subtended by the tilt angle to the length B2 of the circular arc subtended by the second boundary angle. Specifically, the output value Steer is calculated in accordance with the following formula (6).

$$\text{Steer} = A/B2 \quad (6)$$

In the above formula (6), a symbol "+" is assigned to the ratio in order to indicate the controller 5 tilted to the right. The output value data 70 stored in the main memory is updated to data representing the output value Steer which is newly calculated by the above formula (6). After step S66, the CPU 10 finishes the output calculation process.

Generally, in a program processing, a processing load becomes larger when calculations are performed using trigonometric functions. In the present embodiment, since an input value from the acceleration sensor 37 is represented by a vector, a tilt angle is also represented by a two-dimensional vector for the purpose of simplifying the calculations (i.e., for the purpose of performing the calculations without using the trigonometric functions). Furthermore, for the same purpose, a length of a circular arc (circular measure) is used instead of an angle when calculating the aforementioned ratio. However, in another embodiment, any method may be used for calculating the aforementioned ratio. For example, a magnitude $\theta1[°]$ of the tilt angle and a magnitude $\theta2[°]$ of the boundary angle may be obtained so as to calculate a ratio of the magnitude $\theta1$ of the tilt angle to the magnitude $\theta2$ of the boundary angle. Furthermore, as described above, any calculation method may be used, only if an output value is calculated based on the tilt angle and the boundary angle and also calculated such that an allowable range thereof is limited.

Referring back to FIG. 3, in step S8 subsequent to step S7, the CPU 10 executes the game processing using the output value Steer calculated in step S7. For example, in the case of playing a car racing game, the output value Steer calculated in step S7 is applied to a turning angle of a steering wheel, and a vehicle to be operated by the player is moved in accordance with the turning angle of the steering wheel. Also in step S8, the CPU 10 generates an image representing a result of the game processing, and displays the generated image on the television 2. Note that the game processing using the output value Steer may be of any type. For example, in the case of playing the car racing game, the output value may be applied to, other than the turning angle of the steering wheel, an orientation of each tire of the vehicle, a traveling direction of the vehicle or the like. In another embodiment, an output value may be used in a game processing other than a car racing game. After step S8, a process of step S9 is executed.

In step S9, the CPU 10 determines whether or not the game is to be finished. The determination in step S9 is made based on, for example, whether the game is cleared or not, whether the game is over or not, whether the player issues an instruction to stop the game or not and the like. When it is determined "No" in step S9, the process of step S2 is executed again.

Thereafter, until it is determined that the game is to be finished in step S9, the process loop from steps S2 to S9 is repeatedly executed. On the other hand, when it is determined "Yes" in step S9, the CPU 10 finishes the game processing shown in FIG. 13. This is the end of the description of the game processing.

As described above, according to the present embodiment, the CPU 10 calculates a tilt angle of the controller 5 (step S4), and when the calculated tilt angle is greater than a boundary angle, the boundary angle is updated such that the calculated tilt angle becomes a new boundary angle (step S5). Thereafter, an output value is calculated based on a ratio of the tilt angle to the boundary angle having been updated (step S6). Thus, an operation applied to the controller 5 always reflects an output value, thereby avoiding a problem that an output value remains unchanged even if the tilt angle of the controller 5 changes. Accordingly, the ease of operation can be improved.

Although the above embodiment illustrates an example where an information processing apparatus according to the present invention is a game apparatus for executing a game processing, the present invention is not limited thereto. The present invention is also applicable as an information processing apparatus for executing information processing of any type in accordance with an operation of tilting an input device.

(Variant of Input Device)

In the above embodiment, the controller 5 as the input device is provided separately from the stationary game apparatus 3. However, in another embodiment, it is unnecessary to provide the input device and the information processing apparatus (game apparatus) separately from each other, and the input device may be integrally provided with the information processing apparatus. The present invention is also applicable as a portable apparatus including an acceleration sensor (a portable game apparatus, a cellular telephone and the like), for example.

(Variant of Means for Calculating Tilt Angle)

In the above embodiment, a tilt of the input device (controller 5) is detected by using the acceleration sensor 37, and the tilt angle of the input device is calculated based on the detection result. Note that any means may be used for calculating the tilt angle. For example, in another embodiment, instead of the acceleration sensor 37, the gyro-sensor mentioned above may be used to detect the tilt of the input device. Or a camera (the image pickup element 40, for example) may be used to detect the tilt of the input device. In the case of using the camera, the information processing apparatus detects a predetermined image (i.e., images of the respective markers 6R and 6L) from an image picked up by the camera once within a predetermined time period. A rotation angle of the camera (input device) is calculated based on a change in the predetermined image having been detected, thereby making it possible to calculate the tilt angle of the input device. As described above, the tilt angle of the input device can be calculated by using the camera. Therefore, the present invention is also applicable as a portable apparatus including a camera. Further, unlike the controller 5 of the above embodiment, an input device may not be capable of being tilted at any angle in all directions. The input device may be a device capable of being tilted at any angle only in a predetermined one direction. For example, the input device may be a device capable of being rotated in a predetermined one direction such as a jog dial or a wheel of a mouse.

As described above, an object of the present invention is to improve an ease of operation using an input device capable of being tilted at any angle. For example, the present invention is applicable as an information processing program such as a game program and the like, or an information processing apparatus such as a game apparatus and the like.

While the invention has been described in detail, the foregoing description is in all aspects illustrative and not restrictive. It is understood that numerous other modifications and variations can be devised without departing from the scope of the invention.

What is claimed is:

1. A computer-readable storage medium storing an information processing program to be executed by a computer of an information processing apparatus which calculates an output value within a predetermined range in accordance with a tilt angle of an input device capable of being tilted at any angle, wherein a memory of the information processing apparatus for storing boundary angle data representing a boundary angle corresponding to the tilt angle, of the input device, obtained when the output value is equal to a value of a boundary of the predetermined range, and the information processing program causes the computer to execute:

a tilt calculation step of calculating the tilt angle of the input device by obtaining, from the input device, input data including a value changed in accordance with the tilt angle of the input device;

an accessing step of accessing boundary angle data corresponding to the tilt angle obtained when the output value is equal to a value of a boundary of the predetermined range;

a first update step of updating the boundary angle data, when the tilt angle calculated in the tilt calculation step is greater than the boundary angle represented by the boundary angle data, such that the tilt angle calculated in the tilt calculation step becomes a new boundary angle; and an output calculation step of calculating the output value based on a ratio of the tilt angle calculated in the tilt calculation step to the boundary angle represented by the boundary angle data.

2. The computer-readable storage medium according to claim 1, wherein the memory further stores a reference angle of the boundary angle, and the information processing program causes the computer to further execute a second update step of updating the boundary angle data, when the tilt angle calculated in the tilt calculation step is less than the boundary angle represented by the boundary angle data, the boundary angle data such that the boundary angle becomes the reference angle.

3. The computer-readable storage medium according to claim 2, wherein the tilt calculation step is repeatedly executed, and the second update step includes a reduction step of repeatedly executing, each time the tilt calculation step calculates the tilt angle, a reduction process of decreasing the boundary angle within a range in which the boundary angle represented by the boundary angle data does not become less than the reference angle, until the boundary angle becomes equal to the reference angle.

4. The computer-readable storage medium according to claim 3, wherein in the reduction step, the reduction process is executed so as to decrease the boundary angle within a range in which the boundary angle represented by the boundary angle data does not become less than the tilt angle calculated in the tilt calculation step.

5. The computer-readable storage medium according to claim 1, wherein
the input device includes an acceleration sensor for detecting an acceleration generated in the input device, and the tilt calculation step includes:
an obtainment step of obtaining the acceleration detected by the acceleration sensor; and
a calculation execution step of calculating the tilt angle of the input device by using the obtained acceleration.

6. The computer-readable storage medium according to claim 5, wherein
the tilt calculation step further includes a correction step of correcting the obtained acceleration,
the obtainment step, the correction step and the calculation execution step are repeatedly executed,
in the correction step, correcting the acceleration which is currently obtained in the obtainment step so as to be close to a most recently corrected acceleration, and
in the calculation execution step, calculating the tilt angle of the input device by using the acceleration corrected in the correction step.

7. The computer-readable storage medium according to claim 6, wherein
in the correction step, correcting the currently obtained acceleration such that the closer a magnitude of the currently obtained acceleration is to a magnitude of a gravitational acceleration, the closer the corrected currently obtained acceleration becomes to the currently obtained acceleration before being corrected.

8. The computer-readable storage medium according to claim 5, wherein
the acceleration sensor detects the acceleration along respective axes of a predetermined three-dimensional coordinate system set with respect to the input device,
in the obtainment step, obtaining the acceleration represented by a three-dimensional vector in the three-dimensional coordinate system from the acceleration sensor, and
in the calculation execution step, converting the three-dimensional vector into a two-dimensional vector on a plane passing through an origin of the three-dimensional coordinate system, and represents the tilt angle of the input device by the two-dimensional vector having been converted.

9. The computer-readable storage apparatus according to claim 8, wherein
in the calculation execution step, converting the three-dimensional vector into a two-dimensional vector on a plane containing one axis of the three-dimensional coordinate system.

10. An information processing apparatus which calculates an output value within a predetermined range in accordance with a tilt angle of an input device capable of being tilted at any angle, the information processing apparatus comprising:
a memory for storing boundary angle data representing a boundary angle corresponding to the tilt angle, of the input device, obtained when the output value is equal to a value of a boundary of the predetermined range;
tilt angle calculation programmed logic circuitry for calculating the tilt angle of the input device by obtaining, from the input device, input data including a value changed in accordance with the tilt angle of the input device;
first update programmed logic circuitry for updating the boundary angle data, when the tilt angle calculated by the tilt calculation programmed logic circuitry is greater than the boundary angle represented by the boundary angle data, the boundary angle data such that the tilt angle calculated by the tilt calculation programmed logic circuitry becomes a new boundary angle; and
output calculation programmed logic circuitry for calculating the output value based on a ratio of the tilt angle calculated by the tilt calculation programmed logic circuitry to the boundary angle represented by the boundary angle data.

11. The information processing apparatus according to claim 10, wherein
the memory further stores a reference angle of the boundary angle, and
the information processing apparatus further comprises second update programmed logic circuitry for updating the boundary angle data, when the tilt angle calculated by the tilt calculation programmed logic circuitry is less than the boundary angle represented by the boundary angle data, such that the boundary angle becomes the reference angle.

12. The information processing apparatus according to claim 11, wherein
the tilt calculation programmed logic circuitry repeatedly calculates the tilt angle, and
the second update programmed logic circuitry includes reduction programmed logic circuitry for repeatedly executing, each time the tilt calculation programmed logic circuitry calculates the tilt angle, a reduction process of decreasing the boundary angle within a range in which the boundary angle represented by the boundary angle data does not become less than the reference angle, until the boundary angle becomes equal to the reference angle.

13. The information processing apparatus according to claim 12, wherein
the reduction programmed logic circuitry executes the reduction process so as to decrease the boundary angle within a range in which the boundary angle represented by the boundary angle data does not become less than the tilt angle calculated by the tilt calculation programmed logic circuitry.

14. A calculation method of calculating an output value within a predetermined range in accordance with a tilt angle of an input device capable of being tilted by any angle, wherein
a memory of an information processing apparatus for storing, boundary angle data representing a boundary angle corresponding to the tilt angle, of the input device, obtained when the output value is equal to a value of a boundary of the predetermined range, and
the calculation method comprises:
a tilt calculation step of calculating the tilt angle of the input device by obtaining, from the input device, input data including a value changed in accordance with the tilt angle of the input device;
an accessing step of accessing said boundary angle data corresponding to the tilt angle obtained when the output value is equal to a value of a boundary of the predetermined range;
a first update step of updating the boundary angle data, when the tilt angle calculated in the tilt calculation step is greater than the boundary angle represented by the boundary angle data, such that the tilt angle calculated in the tilt calculation step becomes a new boundary angle; and
an output calculation step of calculating the output value based on a ratio of the tilt angle calculated in the tilt calculation step to the boundary angle represented by the boundary angle data.

* * * * *